(12) United States Patent  
Satoh et al.

(10) Patent No.: US 7,265,773 B2
(45) Date of Patent: Sep. 4, 2007

(54) MISALIGNMENT DETECTION DEVICE, OPTICAL WRITING APPARATUS, AND IMAGE FORMING APPARATUS

(75) Inventors: Nobuyuki Satoh, Yokohama (JP); Minoru Aoki, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 400 days.

(21) Appl. No.: 10/831,289

(22) Filed: Apr. 26, 2004

(65) Prior Publication Data

US 2004/0212672 A1   Oct. 28, 2004

(30) Foreign Application Priority Data

Apr. 24, 2003  (JP) .............................. 2003-119343

(51) Int. Cl.
*B41J 27/00* (2006.01)
(52) U.S. Cl. ...................................... 347/241; 347/256
(58) Field of Classification Search ........ 347/116–117, 347/229–230, 233–235, 241–244, 248–254, 347/250, 256–258, 240; 399/128, 301; 382/154; 398/68; 359/204; 358/540; 356/19–22, 356/388–401, 239.3, 600, 246.6
See application file for complete search history.

(56) References Cited

U.S. PATENT DOCUMENTS

| | | | |
|---|---|---|---|
| 5,023,708 A * | 6/1991 | Maruyama et al. ......... | 358/540 |
| 5,666,609 A | 9/1997 | Aoki | |
| 5,805,955 A | 9/1998 | Aoki | |
| 5,867,759 A | 2/1999 | Isobe et al. | |
| 5,884,125 A * | 3/1999 | Taniguchi et al. .......... | 399/128 |
| 5,930,019 A * | 7/1999 | Suzuki et al. ............... | 359/204 |
| 6,181,363 B1 | 1/2001 | Satoh | |
| 6,229,913 B1 * | 5/2001 | Nayar et al. ................ | 382/154 |
| 6,285,849 B1 * | 9/2001 | Shimada et al. ........... | 399/301 |
| 7,006,235 B2 * | 2/2006 | Levy et al. ................. | 356/600 |
| 2005/0025483 A1 * | 2/2005 | Gurevich et al. ............ | 398/68 |

FOREIGN PATENT DOCUMENTS

| | | |
|---|---|---|
| JP | 06-001002 | 1/1994 |
| JP | 06-018796 | 1/1994 |

(Continued)

OTHER PUBLICATIONS

U.S. Appl. No. 10/667,305, filed Sep. 23, 2003, Satoh.

*Primary Examiner*—Hai Pham
(74) *Attorney, Agent, or Firm*—Oblon, Spivak, McClelland, Maier & Neustadt, P.C.

(57) ABSTRACT

An image detection device includes a light source, an image sensor, a light guiding device, an image focusing device and a housing. The light source is configured to irradiate a pattern image with a light beam. The light guiding device is located on a first light path from the light source to the pattern image and is configured to guide the light beam irradiated by the light source to the image and further guide the light reflected from the pattern image to the image sensor along a second light path. The image focusing device is located on the second light path of from the light guiding device to the image sensor and is configured to focus the light reflected from the pattern image on the image sensor. The housing is configured to contain the light source, the image sensor, the light guiding device and the image focusing device.

18 Claims, 20 Drawing Sheets

FOREIGN PATENT DOCUMENTS

| | | | |
|---|---|---|---|
| JP | 06001002 A | * | 1/1994 |
| JP | 07-261628 | | 10/1995 |
| JP | 08076529 A | * | 3/1996 |
| JP | 09-073215 | | 3/1997 |
| JP | 2000-259042 | | 9/2000 |
| JP | 2000-267027 | | 9/2000 |
| JP | 2001-318327 | | 11/2001 |
| JP | 3253227 | | 11/2001 |
| JP | 2001-341348 | | 12/2001 |

* cited by examiner

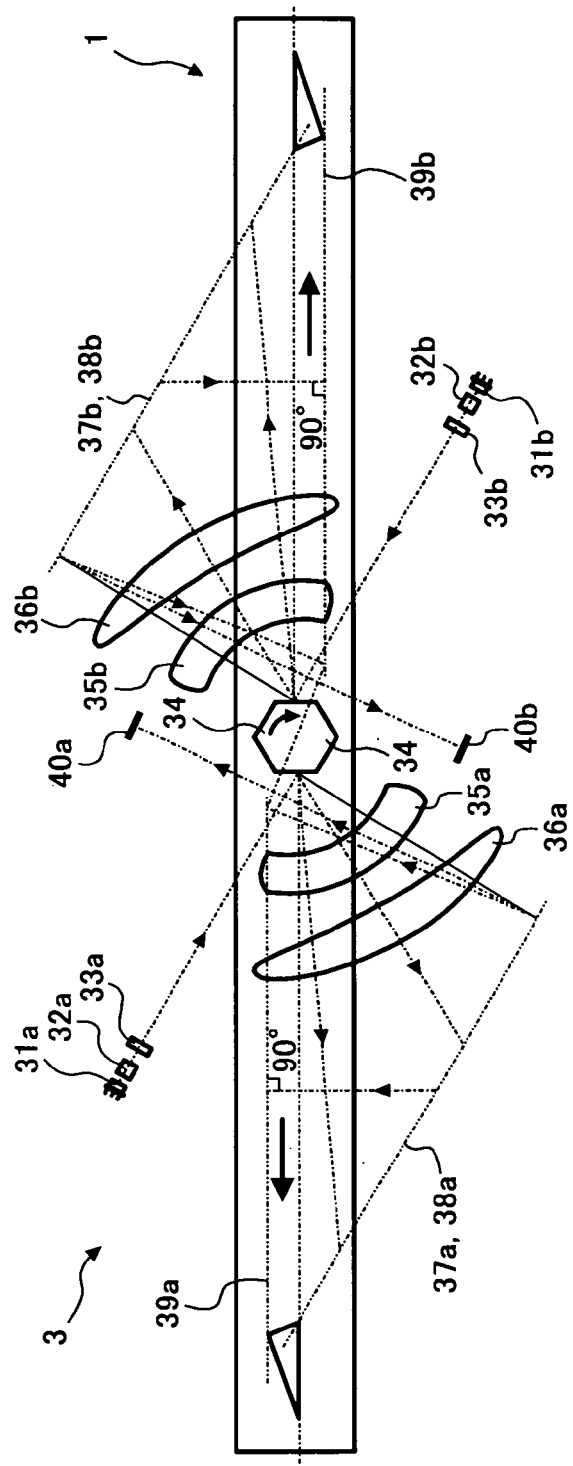
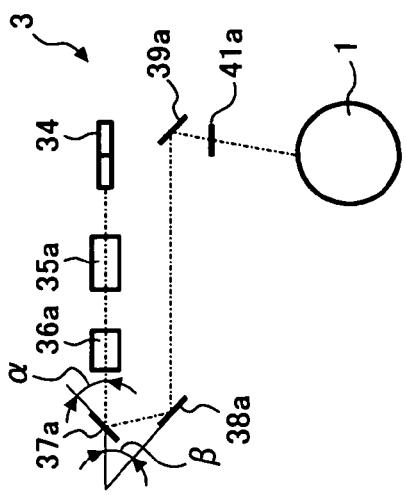
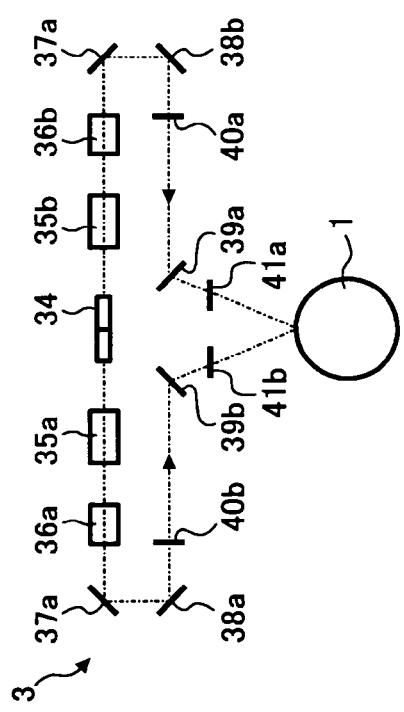
FIG. 4A
FIG. 4C
FIG. 4B

MISALIGNMENT DETECTION DEVICE, OPTICAL WRITING APPARATUS, AND IMAGE FORMING APPARATUS

BACKGROUND OF THE INVENTION

1. Field of the Invention

The present invention relates to a misalignment detection device which determines whether an image is identical to a reference image, and an optical writing apparatus, an image forming apparatus and a photocopier which use the misalignment detection device.

2. Discussion of the Background

Recently, image forming apparatuses having multiple optical writing systems, which can irradiate light beams to form a latent electrostatic image on a photoconductor serving as an image bearing body, have been developed.

Published unexamined Japanese Patent Application (hereinafter referred to as JOP) No. 2000-267027 discloses an image forming apparatus capable of forming images on a paper having a large width such as A1 and A0 sizes. The image forming apparatus includes a low-cost and high definition optical writing system having a large width by separately scanning multiple optical writing systems so that the scanned light beams are lined in the main scan direction (this optical writing system is referred to as a separate scanning optical system).

JOP No. 6-18796 discloses an image forming apparatus having multiple optical writing systems and multiple photoconductors serving as image bearing members to obtain a multi-color image. This is generally referred to as "tandem image forming apparatus". In the apparatus, a multi-color image is obtained as follows. The multiple optical writing systems irradiate the respective image bearing members with a laser beam for forming latent electrostatic images thereon. The latent images are developed with respective color toners. The toner images are overlaid on a transfer material such as a transfer belt or paper.

Further, JOP No. 6-1002 discloses another image forming apparatus having multiple optical writing systems and a sole photoconductor. In this apparatus, a multi-color image is obtained by irradiating the sole photoconductor with a light beam emitted by each of the multiple optical writing systems to form latent electrostatic images; and developing the images with respective color toners.

However, in the image forming apparatus disclosed in JOP No. 2000-267027, the multiple laser beams used take separate light paths when scanning. Therefore, the relative positions of the multiple laser beams to each other vary depending on temperature distributions in the writing systems, environmental variances and variances of wavelengths of the laser beams caused by the temperature of the laser diodes. This causes problems of white streaks and black streaks at joint points, resulting in serious deterioration in image quality. The laser beam positions also vary in the cases of the image forming apparatuses disclosed in JOP Nos. 6-18796 and 6-1002 and this leads to a problem of misalignment of the overlaid color images, resulting in deterioration of image qualities such as non-uniform coloring and blur.

To address these problems, Japanese Patent No. 3253227 discloses a beam position correction method. In this method, a charge coupled device (CCD) functioning as an image sensor is provided to determine whether the registration marks formed on the transfer belt for correcting the positions of the beams are correctly aligned. Further, to improve the misalignment detection precision level, multiple light sources are symmetrically located relative to the registration marks. Thereby the registration marks can be irradiated with substantially uniform amount of light from any angle, resulting in minimization of the error caused by seesaw movement of the transfer belt.

However, the technology disclosed in this patent requires multiple light sources of light emitting diodes (LED) and thereby causes a cost problem. In addition, a condenser lens for collimating flux of light from LED chips is also proposed in the patent but is also costly. Furthermore, a focal length of the detection optical system is minimally about 8 mm. Therefore, when an object and the image thereof have the same size, the minimum conjugation length is about 35 mm by calculation (8 mm times 4+the distance between the principal points of the lenses). This is a large barrier to miniaturization of the device since the total height thereof is almost 40 mm while taking the size of the CCD and the thickness of the substrate into consideration.

A mark for use in detecting misalignment can be formed on a photoconductor. In this case, since photoconductors typically have a mirror surface where diffuse reflection rarely occurs, the regular reflection light from the mark needs to be securely focused on an image sensor. When the regular reflection light from the mark for detecting misalignment does not reach the image sensor, the image sensor misjudges that the mark is total black. The reason therefore is that the mark is formed by toner and the mark formed with black toner has little diffuse reflection.

Because of these reasons, the need still exists for a compact-sized and low-cost misalignment detection device which can determine whether an image is misaligned from its correct position with high precision.

SUMMARY OF THE INVENTION

Accordingly, an object of the present invention is to provide a miniaturized image detection device which can determine whether a sample image formed on an image bearing member is identical to a reference image with high precision without using a plurality of light sources, for example, to form quality images without a streak on a wide paper.

Another object of the present invention is to provide an optical writing apparatus which can form quality latent images on a wide image bearing member by detecting and correcting a scanning misalignment of light beams emitted from multiple optical writing systems.

Yet another object of the present invention is to provide an image forming apparatus which can produce quality images on wide receiving materials.

Briefly it will become readily apparent that these objects and other objects of the present invention as hereinafter described can be attained by an image detection device which includes a light source, an image sensor, a light guiding device, an image focusing device and a housing. The light source is configured to irradiate a pattern image with a light beam. The light guiding device is located on a first light path from the light source to the pattern image and is configured to guide the light beam irradiated by the light source to the image and further guide the light reflected from the pattern image to the image sensor along a second light path. The image focusing device is located on the second light path from the light guiding device to the image sensor and is configured to focus the light reflected from the pattern image on the image sensor. The housing is configured to contain the light source, the image sensor, the light guiding device and the image focusing device. In addition, the optical axis of the light reflected from the pattern image coincides with the optical axis of the image focusing device.

As another aspect of the present invention, there is provided an optical writing apparatus which includes at least two optical writing systems, the image detection device mentioned above, an image comparing device and a scan adjusting device. The at least two optical writing systems irradiate an image bearing member with respective light beams while scanning the light beams to form a visual image on the image bearing member. The image detection device detects the pattern image when the visual image is a pattern image. An image comparing device compares the pattern image detected by the image detection device with a reference image to determine whether the pattern image is identical to the reference image. The scan adjusting device adjusts scanning position of the at least one of the at least two light beams such that the pattern image is substantially identical to the reference image.

As yet another aspect of the present invention, there is provided an image forming apparatus which includes at least one photoconductive image bearing member, at least two optical writing systems, a developing device, the image detection device mentioned above, an image comparing device, and a scan adjusting device. The at least two optical writing systems irradiate the at least one photoconductive image bearing member with respective light beams while the two optical writing systems scan the respective light beams in the main scanning direction and the at least one photoconductive image bearing member rotates in the sub-scanning direction to form a latent image on the at least one photoconductive image bearing member. The developing device develops the latent image to form a visual image on the at least one photoconductive image bearing member. The image detection device detects the pattern image when the visual image is a pattern image. The image comparing device compares the pattern image detected by the image detection device with a standard image to determine whether the pattern image is identical to the reference image. The scan adjusting device adjusts scanning position of the at least one of the at least two light beams such that the pattern image is substantially identical to the standard image.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIGS. 4A, 4B and 4C are diagrams illustrating the positional relationships among members of the optical writing apparatus;

DESCRIPTION OF THE PREFERRED EMBODIMENTS

Figure 1:
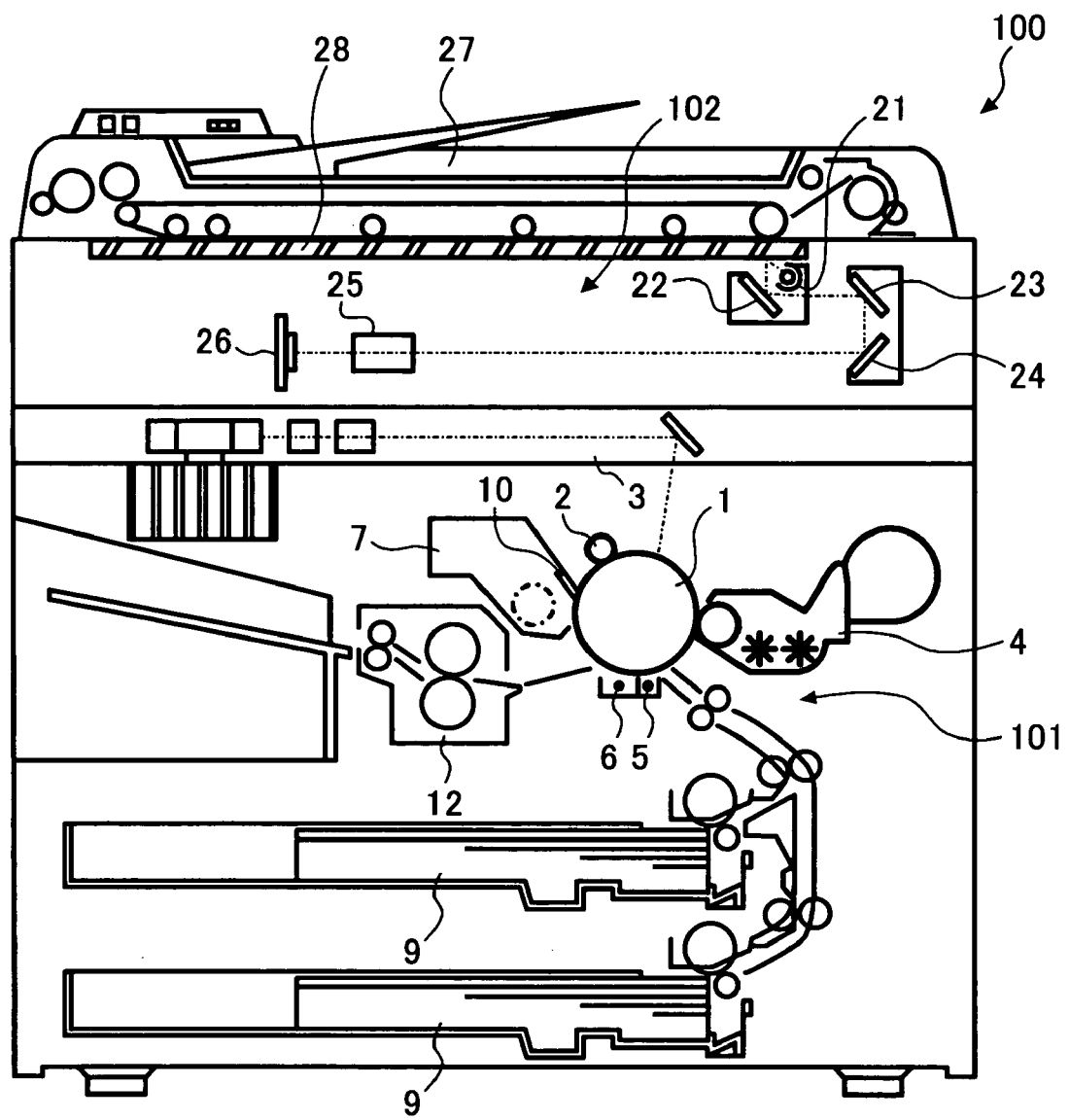
FIG. 1 is a cross sectional diagram illustrating an embodiment of the image forming apparatus of the present invention.

Generally, the present invention provides an image detection device which includes a light source, an image sensor, a light guiding device, an image focusing device and a housing. The light source is configured to irradiate a pattern image with a light beam. The light guiding device is located on a first light path from the light source to the pattern image and is configured to guide the light beam irradiated by the light source to the image and further guide the light reflected from the pattern image to the image sensor along a second light path. The image focusing device is located on the second light path of from the light guiding device to the image sensor and is configured to focus the light reflected from the pattern image on the image sensor. The housing is configured to contain the light source, the image sensor, the light guiding device and the image focusing device. In addition, the optical axis of the light reflected from the pattern image coincides with the optical axis of the image focusing device.

In this device, the light from the light source transmits through the light guiding device to irradiate the pattern image (hereinafter this light path is referred to as a first light path). The light reflected from the pattern image again passes the light guiding device so as to be guided to the image sensor (herein after this light path is referred to as a second light path). Since the second light path is changed from the first light path in the middle thereof, it is possible to provide a miniaturized image detection device.

Further, since the light following the second light path is orthogonally incident on the image sensor, the reflected light from the image is securely guided to the image sensor. Therefore, the S/N ratio of the image portion to a non-image portion surrounding the image portion is high and thereby recognition precision can be improved. In addition, only a single light source is required for irradiation and thus the cost is reduced.

It is preferred that, in the image detection device mentioned above, a half mirror is used as the light guiding device. The half mirror has a first surface and a half mirror surface from which the light reflected from the pattern image is reflected to guide the light to the image focusing device.

In this case, the light from the light source transmits through the half mirror to irradiate the pattern image. The light reflected from the pattern image again passes the half mirror so as to be guided to the image sensor. Since the second light path is changed from the first light path in the middle thereof, it is possible to provide a miniaturized image detection device.

Further, by using the half mirror, the light from the light source perpendicularly irradiates the image and the reflected light from the image transmits through the half mirror at which the light path is changed to guide the light into the image sensor. Thereby the reflected light from the image is orthogonally incident on the image sensor. Therefore the reflected light from the image is securely guided to the image sensor. Naturally, the S/N ratio of the image portion to a non-image portion surrounding the image portion is high and thereby recognition precision can be improved. In addition, only a single light source is required for irradiation and thus the cost is reduced.

It is also preferred that, in the image detection device including the half mirror mentioned above, the half mirror surface is subjected to antireflective coating.

In this case, the coated side reflects a portion of the incident light and transmits another portion thereof and the uncoated side prevents the light which have transmitted through the uncoated side from reflecting and entering into the image sensor, i.e., double reflection and stray light are prevented from entering into the image sensor. Therefore, the precision of detecting an image can be improved.

It is also preferred that, in the image detection device mentioned above, a prism is used as the light guiding device and the bottom surface of the prism and the surface on which the pattern image is formed makes an angle which is half of the angle made by a plane perpendicular to the bottom surface of the prism and the first light path of from the bottom surface to the pattern image.

In this case, the light from the light source transmits through the prism to irradiate the pattern image. The light reflected from the pattern image again passes the prism so as to be guided to the image sensor. Since the second light path is changed from the first light path in the middle thereof, it is possible to provide a miniaturized image detection device.

Further, since the angle formed by the bottom surface of the prism and the surface on which the pattern image is formed is a half of the angle formed by a plane perpendicular to the bottom surface of the prism and the first light path of from the bottom surface to the pattern image, the reflected light from the image is adjusted to be orthogonally incident on the image sensor. Therefore, the reflected light from the image is securely guided to the image sensor. Therefore, the S/N ratio of the image portion to a non-image portion surrounding the image portion is high and thereby recognition precision can be improved. In addition, only a single light source is required for irradiation and thus the cost is reduced.

It is also preferred that, in the image detection device mentioned above, a dust control element functioning as a dust-control means is provided. The dust control device is located between the light guiding device and the pattern image to prevent the light guiding device from accumulating dust.

When light from the light source irradiates an image such as a toner image formed on an image bearing member and the toner image is not fixed yet, the unfixed toner on the image bearing member may lose its electric charge and therefore scatter. Even in this case, this dust control element can prevent such scattered toner from entering into the housing containing the image detection device.

It is also preferred that, in the image detection device mentioned above, the light irradiated from the light source is infrared light.

By using infrared light, deterioration of the surface of the image bearing member can be restrained.

It is also preferred that, in the image detection device mentioned above, the light source and the image sensor are set on the same substrate.

Therefore, the number of parts used decreases, resulting in cost reduction and the device can be miniaturized.

The present invention also provides an optical writing apparatus which includes the following: at least two optical writing systems; the image detection device mentioned above; an image comparing device; and a scan adjusting device. The at least two optical writing systems irradiate an image bearing member with respective light beams while scanning the light beams to form a visual image on the image bearing member. The image detection device detects the pattern image when the visual image is a pattern image. An image comparing device compares the pattern image detected by the image detection device with a reference image to determine whether the pattern image is identical to the reference image. The scan adjusting device adjusts scanning position of the at least one of the at least two light beams such that the pattern image is substantially identical to the reference image.

In this case, the scanning misalignment of one or more of the light beams emitted by the optical writing systems can be determined based on the comparison of the pattern with a reference image. The scanning misalignment of the light beam is corrected based on this scanning misalignment determination. Therefore, it is possible to obtain a quality image using light beams irradiated by the multiple optical writing systems.

The present invention also provides an image forming apparatus which includes at least one photoconductive image bearing member, at least two optical writing systems, a developing device, the image detection device mentioned above, an image comparing device, and a scan adjusting device. The at least two optical writing systems irradiate the at least one photoconductive image bearing member with respective light beams while the two optical writing systems scan the respective light beams in the main scanning direction and the at least one photoconductive image bearing member rotates in the sub-scanning direction to form a latent image on the at least one photoconductive image bearing member. The developing device develops the latent image to form a visual image on the at least one photoconductive image bearing member. The image detection device detects the pattern image when the visual image is a pattern image. The image comparing device compares the pattern image detected by the image detection device with a standard image to determine whether the pattern image is identical to the reference image. The scan adjusting device adjusts scanning position of the at least one of the at least two light beams such that the pattern image is substantially identical to the standard image.

Therefore, the optical writing apparatus can determine whether the scanning position of the light beams irradiated by the optical writing systems is proper, based on comparison of the pattern image with a reference pattern image. When the position is not proper, the scanning adjusting device adjusts the scanning position of at least one of the light beams of the light beam irradiated by the optical writing systems. Therefore, it is possible to obtain a quality image using the light beams irradiated by the multiple optical writing systems.

It is also preferred that, in the image forming apparatus mentioned above, the pattern image is two independent parallel lines arranged in the sub-scanning direction and the two independent parallel lines are formed by the respective light beams of the at least two optical writing systems.

Thereby, the influence of irregularity in the rotation speed of the image bearing member is eliminated. Therefore, it is possible to perform misalignment detection with high precision. Furthermore, it is also possible to alleviate the burden on a calculation means used for determining whether the beam position is proper and therefore reduce the cost of the device.

It is also preferred that, in the image forming apparatus mentioned above, the pattern image includes two independent parallel lines arranged in the main-scanning direction, and the two independent parallel lines are formed by the respective light beams of the at least two optical writing systems.

Thereby, the influence of magnification errors of the optical systems is eliminated. Therefore, it is possible to perform misalignment detection with high precision. Furthermore, it is also possible to alleviate the burden on a calculation means used for determining whether the beam position is proper and therefore reduce the cost of the device.

It is also preferred that, in the image forming apparatus mentioned above, the pattern image is two independent dots, and the two independent dots are formed by the respective light beams of the at least two optical writing systems.

Therefore, it is possible to perform the misalignment in both the main scanning direction and the sub-scanning direction at the same time and thereby the processing is efficient.

It is also preferred that, in the image forming apparatus mentioned above, the latent image is a one-line image extending in the scanning direction in which a plurality of latent one-line images formed by the at least two optical writing systems are connected with each other.

Therefore, it is possible to prevent deterioration in qualities of the image produced by the image forming apparatus capable of forming an image on a wide paper such as A1 and A0 size.

It is also preferred that, in the image forming apparatus mentioned above, a multi-color image is obtained by separately irradiating the respective image bearing members with respective light beams irradiated by the respective optical writing systems to form latent images on each image bearing member, developing each latent image with respective color toners, and overlaying the toner images on a transfer material.

Therefore, it is possible to prevent deterioration in qualities of the image produced by the image forming apparatus which is generally referred to as tandem image forming apparatus.

It is also preferred that, in the image forming apparatus mentioned above, a multi-color image is obtained by separately irradiating the sole image bearing member with light beams irradiated by optical writing systems to form latent electrostatic images on the image bearing member and developing latent images with respective color toners.

Therefore, it is possible to prevent deterioration in qualities of the image produced by the image forming apparatus which obtains a multi-color image with a single image bearing member.

It is also preferred that, in the image forming apparatus mentioned above, the surface of the image bearing member on which the pattern image is formed is a mirror surface.

On the mirror surface, there is little diffuse reflection. Therefore, the S/N ratio of the image portion to a non-image portion surrounding the image portion is high and thereby recognition precision can be improved.

It is also preferred that the image forming apparatus mentioned above further includes an image reading device which reads an image of an original.

Therefore, the two or more optical writing systems form the latent image according to the image information read by the image reading device.

A first embodiment of the present invention will be described with reference to FIGS. 1 and 17A to 17C. This embodiment is an application example of a digital photocopier, a multi-functional machine or a facsimile machine using an electrophotographic process.

FIG. 1 is a schematic diagram illustrating a longitudinal sectional elevation of an example of a digital photocopier 100. As illustrated in FIG. 1, the digital photocopier 100 includes a printer engine 101 serving as an image forming apparatus which mainly contains a photoconductor 1 as an image forming member, and also a scanner 102 serving as an image scanner for scanning a document image. The scanner 102 contains an exposure lamp 21, mirrors 22 to 24, an image formation lens 25, a CCD 26 and so on. Numeral 27 denotes an automatic document feeder (ADF) which automatically feeds a document onto a contact glass 28.

Next, the printer engine 101 will be described in detail. As illustrated in FIG. 1, a photoconductor 1, which is a main component of the electrophotographic process, is rotatably mounted to the printer engine 101 in the digital photocopier 100. Around the photoconductor 1, electrophotographic process members such as a charging device 2, an optical writing apparatus 3, a developing device 4, a transferring device 5, a detaching device 6, a cleaning device 7, and a discharging device (not shown) are arranged in this order following the electrophotographic process.

To the surface of the photoconductor 1, a photoconductive film is applied. As such photoconductive materials, inorganic materials or organic materials can be used. In recent years, inorganic photoconductive materials such as amorphous silicon, which are excellent in durability, have been dominant in place of organic materials. The photoconductor 1 made of such materials has a mirror surface which is almost free of diffuse refraction.

The charging device 2 imparts an electric potential required for image formation to the surface of the photoconductor 1 by a contacting or non-contact method. The optical writing apparatus 3 forms a latent electrostatic image, i.e., an electrostatic contrast, on the surface of the photoconductor 1 upon application of irradiation based on image data. The image data used are obtained from personal computers, etc., or by scanning a document image with a charge coupled device (CCD) 26 of the scanner 102 followed by processing the image data to dot patterns. The developing device 4 contains a two-component developer including a toner and a carrier, and develops the latent electrostatic image on the photoconductor 1 with the two-component developer by a magnet brush method. The transferring device 5 transfers the toner image developed on the photoconductor 1 to a transfer paper 9 serving as a transfer material. The detaching device 6 electrostatically detaches the transfer paper 9 from the photoconductor 1. The cleaning device 7 has a cleaning blade 10 and cleans residual powder such as residual toner on the photoconductor 1 therewith after the transferring process. In addition, a heat fixing device 12, which is provided at a location downstream in the conveying direction based on the place of transferring and detaching, fixes the toner image on the transfer paper 9.

The structure of the optical writing apparatus 3 will be described next. The optical writing apparatus 3 of this embodiment is structured to scan a scanning area on the scanned surface with two beams such that the scanning area is divided into two in the main-scanning direction.

Figure 2:
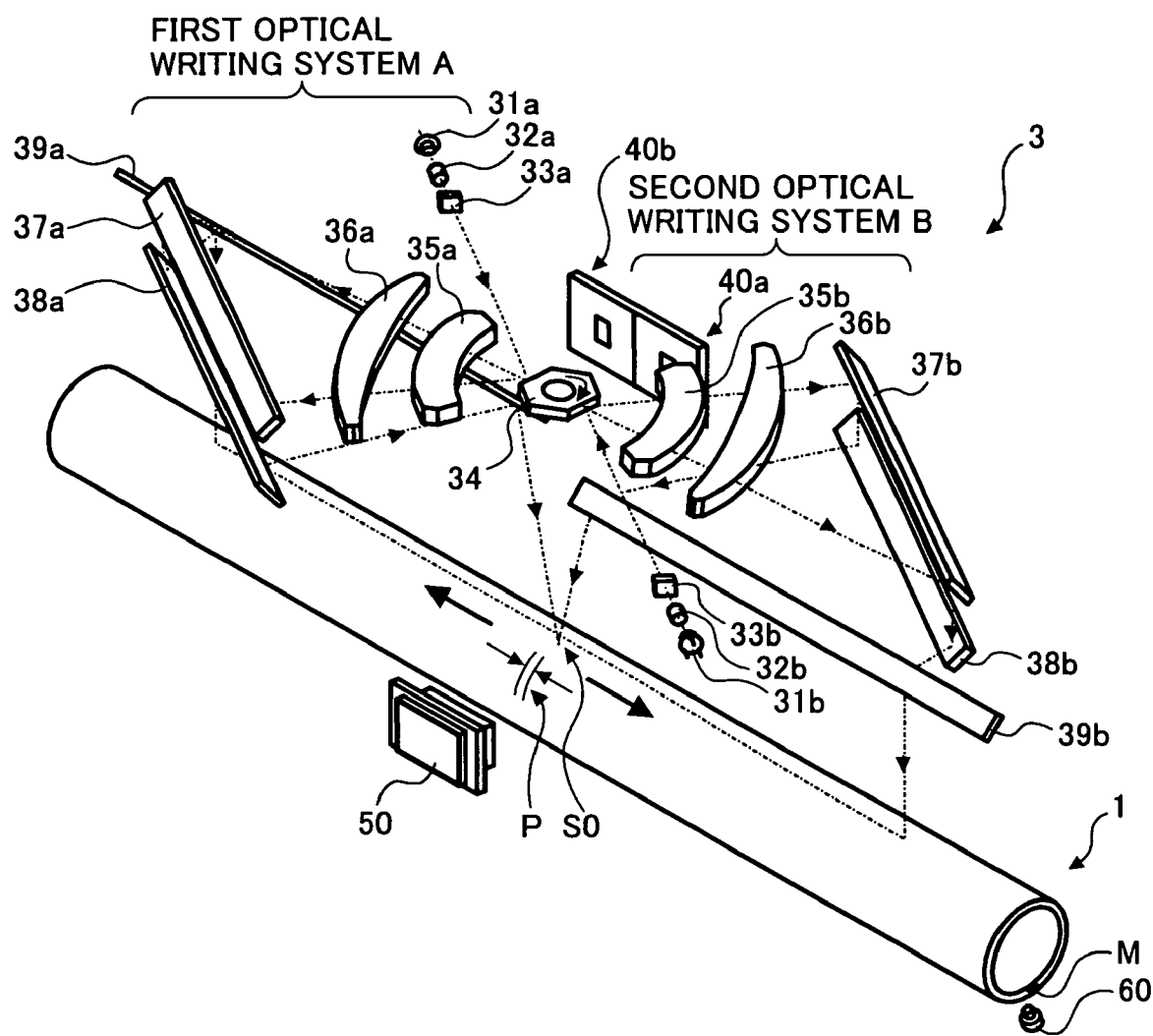
FIG. 2 is a schematic perspective diagram illustrating an example of the optical writing apparatus.
Figure 3:
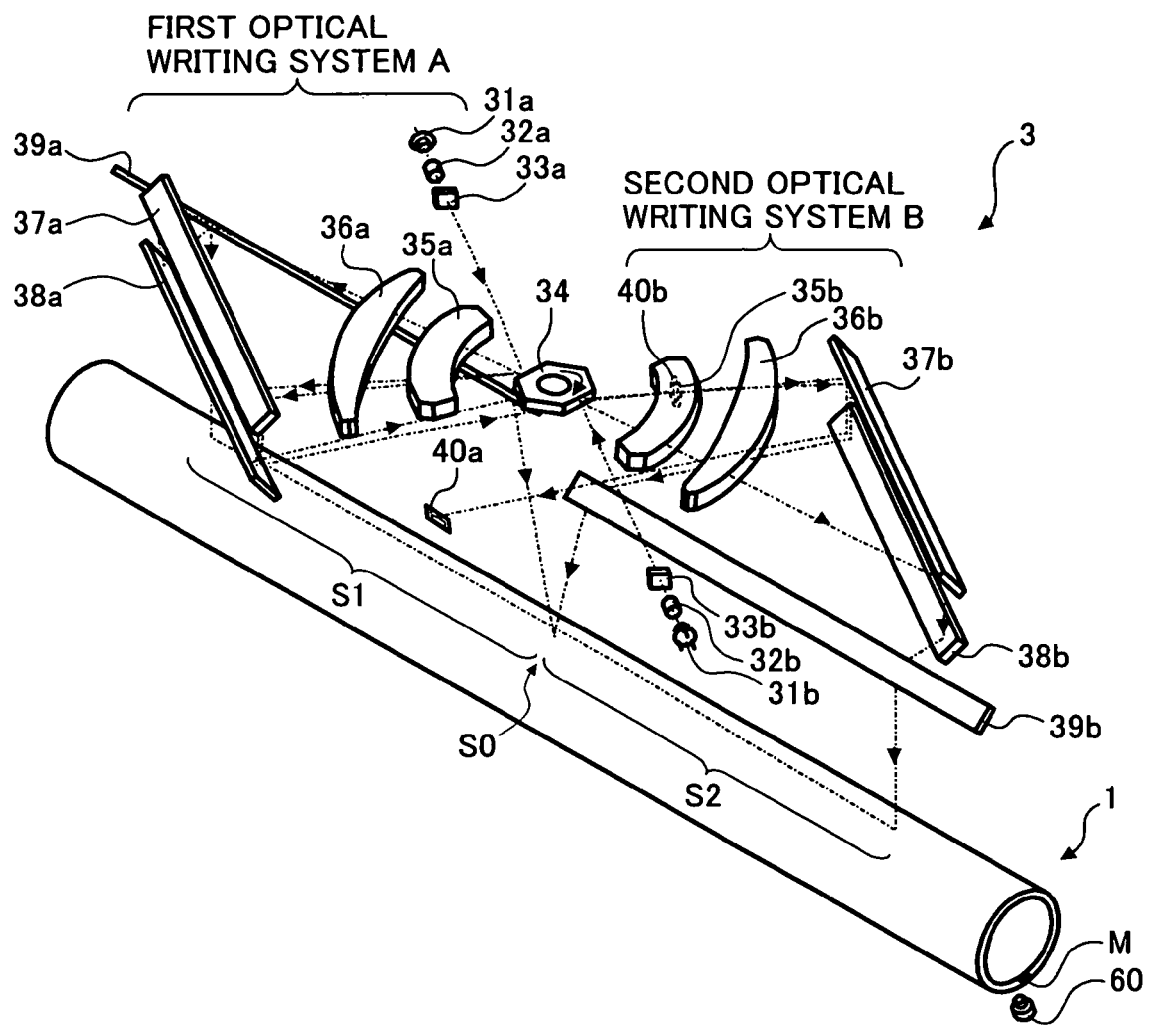
FIG. 3 is a diagram for explaining the writing operations of the optical writing apparatus.

FIG. 2 is a schematic diagram illustrating a perspective view of the optical writing apparatus 3. FIG. 3 is a perspective view illustrating writing operations of the optical writing apparatus 3. FIGS. 4A to 4C illustrate positional relationships of each member of the optical writing apparatus 3. FIG. 4A illustrates the optical writing apparatus 3 from a direction of the rotational axis of a polygon mirror 34. FIG. 4B illustrates the optical writing apparatus 3 from a direction of the axis of the photoconductor 1, which constitutes the entity of the scanned surface. FIG. 4C is a view illustrating only a first optical writing system A of the optical writing apparatus 3.

The optical writing apparatus 3 contains the first optical writing system A and a second optical writing system B as illustrated in FIGS. 2, 4A and 4B. The first optical writing system A has a semiconductor laser 31a as a light source and operates as follows:

(1) a light beam, the intensity of which is modulated according to image signals, is irradiated by the semiconductor laser 31a;
(2) the light beam emitted from the semiconductor laser 31a is collimated by a collimate lens 32a having a collimation function;
(3) the collimated light beam is converged only in the sub-scanning direction by a cylinder lens 33a and forms a long line image in the main-scanning direction around one of the deflection planes of the polygon mirror 34 serving as a deflection means;
(4) the light beam which is deflected by the rotation of the polygon mirror 34 to have a constant angular speed transmits through lenses 35a and 36a, which form an fθ lens serving as an image forming means;
(5) the transmitting light beam is reflected at mirrors 37a, 38a and 39a in this order; and
(6) the reflected light beam forms a beam spot on the photoconductive surface, i.e., the entity of the scanned area, of the photoconductor 1 having a drum shape and scans a second scanning area S1 (refer to FIG. 3) of the photoconductor 1 at a constant speed.

The second optical writing system B is located at the place when the first optical writing system is rotated 180 degrees around the rotation axis of the polygon mirror 34. The second optical writing system B has a semiconductor laser 31b as a light source and operates as follows:

(1) a light beam, the intensity of which is modulated according to image signals, is irradiated by the semiconductor laser 31b;
(2) the light beam emitted from the semiconductor laser 31b is collimated by a collimate lens 32b having a collimation function;
(3) the collimated light beam is converged only in the sub-scanning direction by a cylinder lens 33b and forms a long line image in the main-scanning direction around one of the deflection planes of the polygon mirror 34 serving as a deflection means;
(4) the light beam which is deflected by the rotation of the polygon mirror 34 to have a constant angular speed transmits through lenses 35b and 36b, which form an fθ lens serving as an image forming means;
(5) the transmitting light beam is reflected at mirrors 37b, 38b and 39b in this order; and
(6) the reflected light beam forms a beam spot on the photoconductive surface of the photoconductor 1 having a drum shape and scans a first scanning area S2 (refer to FIG. 3) of the photoconductor 1 at a constant speed.

The first optical writing system A and the second optical writing system B are optically equivalent. As illustrated in FIG. 3, the optical writing system A and the optical writing system B start writing from a joint point S0 of the scanning area S1 and the scanning area S2, i.e., the central part of the scanning area, to each end of the scanning areas.

In addition, the first optical writing system A and the second optical writing system B have synchronization detection units 40a and 40b, respectively. Each of the synchronization units 40a and 40b is set outside the image formation area of each scanning beam and determines the timing of starting scanning of each scanning beam per scan. In FIG. 3, the synchronization units 40a and 40b are symmetrically located around the rotation axis of the polygon mirror 34.

The optical writing apparatus 3 mentioned above starts writing from the start point of writing, which is the joint point S0 of the whole scanning area mentioned above, to the timing determined by a writing control circuit (not shown). Therefore, since the start point of writing each scanning beam is the same joint point S0, it is easy to favorably align the connecting point in the main-scanning direction of each scanning beam detected by the synchronization detection units 40a and 40b.

The first scanning image area S1 and the second scanning image area S2 are preferably connected to make a single straight line. From a designing point of view, both areas are "fixedly designed in the device space". A preferred scanning line "fixedly designed in the device space" is a line which "should be scanned by the two beams at the same time" on the scanned area and which is also "both axes to be scanned". That is, ideally, both the first scanning area S1 and the second scanning area S2 coincide with the both axes to be scanned and are connected with each other at the joint point S0.

Further, the optical writing apparatus 3 is sealed, fixed and located accurately inside a housing which can prevent the optical writing apparatus 3 from accumulating dust. In FIGS. 4B and 4C, numerals 41a and 41b denote dust control glasses to cover the openings for beam emission of the housing.

As illustrated in FIG. 4C, the mirrors 37a and 38a in the first optical writing system A are placed such that both mirrors "spatially overlap in the sub-scanning direction", i.e., top to bottom direction of this figure. In addition, as illustrated in FIG. 4C, tilt angles α and β of the mirrors 37a and 38a to the beam deflection plane, which is parallel to the plane of FIG. 4A, satisfy the following relationship: α–β=90 degrees, wherein α and β are measured based on the beam deflection plane and plus and minus are set in clockwise and counterclockwise, respectively. That is, the mirrors 37a and 37b form "a Dach mirror". The plane sweeping the deflected beam reflected at the mirrors 37a and 37b in this order are parallel to the beam deflection plane. The mirrors 37b and 38b in the second optical writing system B are set in the same manner as mentioned above.

In order for the first optical writing system A and the second optical writing system B to equivalently scan the common scanning line (scanned area line), the following should preferably be satisfied: the axes of the first optical writing system A and the second optical writing system B should preferably be set vertically to both axes of the scanned area, which is parallel to the axis of the photoconductor 1; and the length of the light path for image focusing of the first optical writing system A is equal to that of the second optical writing system B. When these are satisfied, excellent scanning can be performed with a beam spot having a uniform diameter and thus an excellent image can be obtained. In the embodiment mentioned above, an fθ lens serves as the image focusing device.

Figure 5:
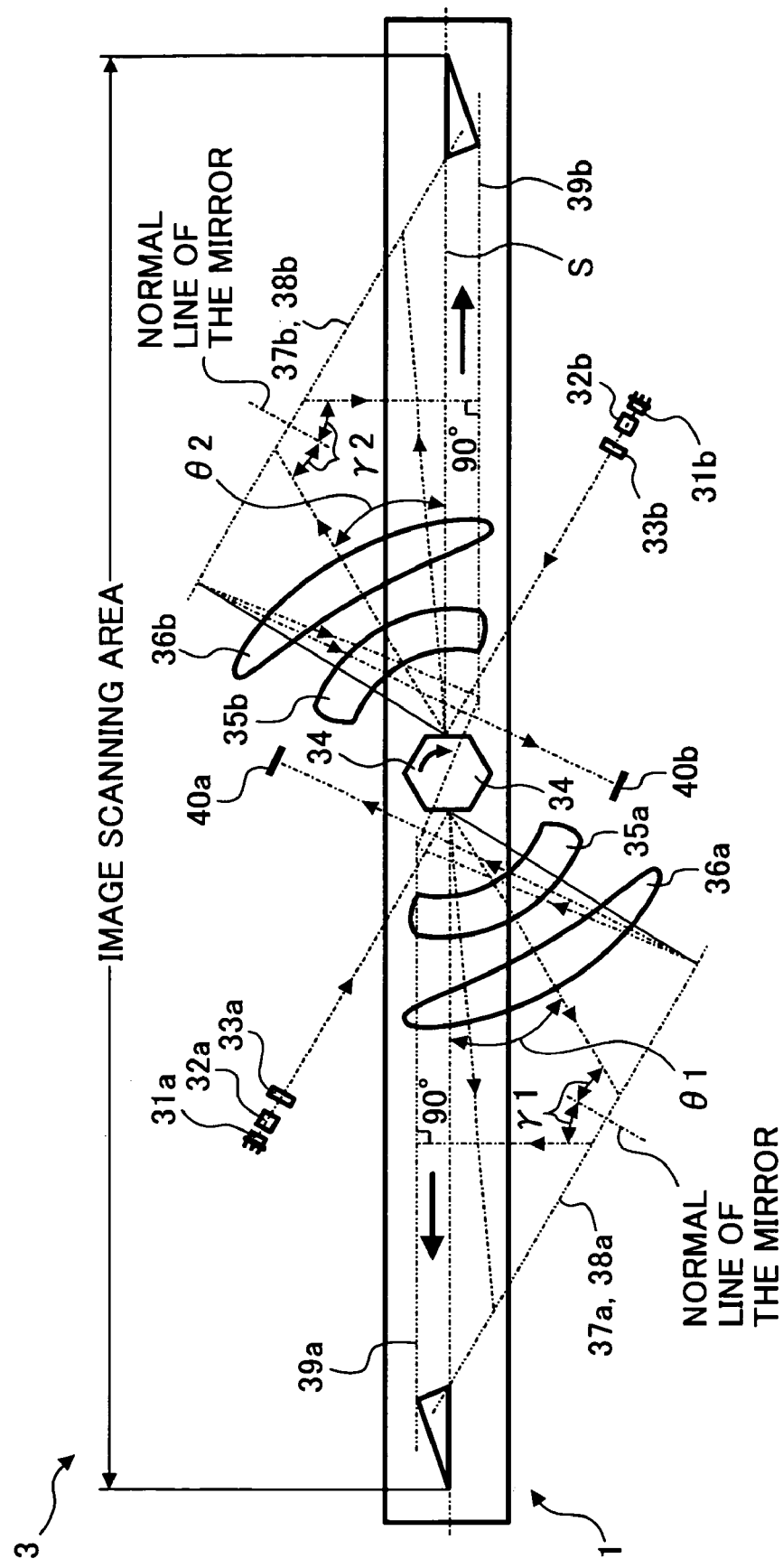
FIG. 5 is a diagram illustrating the optical axis of the fθ lens of the optical writing apparatus.

FIG. 5 is a diagram illustrating the optical axis of the fθ lens of the optical writing apparatus 3. As illustrated in FIG. 5, the optical axis of the fθ lens containing the lenses 35a and 36a has a tilt angle θ1 against the both axes to be scanned S and the optical axis of the fθ lens containing the lenses 35b and 36b has a tilt angle θ2 against the both axes to be scanned S. In order to orthogonalize the axes of both fθ lenses with the both axes to be scanned S, two mirrors are set for each optical writing system, i.e., the first optical writing system A has the mirrors 37a and 38a and the second optical writing system B has the mirrors 37b and 38b, respectively.

In the first optical writing system A, the optical axis of the fθ lens and the mirror 37a form an angle γ1 in the beam deflection plane. The angle γ1 and the angle θ1, which is formed by the optical axis and the both axes to be scanned S, satisfy the following relationship: |θ1|+2|γ1|=90 degrees.

Similarly, in the second optical writing system B, the optical axis of the fθ lens and the mirror 37b form an angle γ2 in the beam deflection plane. The angle γ2 and the angle θ2, which is formed by the optical axis and the both axes to be scanned S, satisfy the following relationship: |θ2|+2|γ2|=90 degrees.

Thus, the main light beam coinciding with the optical axis of each fθ lens is reflected at the mirror 38a or 38b. When the main light beam and both axes to be scanned are projected to the beam deflection plane, the projected main light beam is orthogonal to the projected both axes to be scanned S. Each beam is reflected at the mirror 38a or 38b, guided to the sub-scanning direction and finally orthogonalized with the both axes to be scanned S of each beam.

Figure 6:
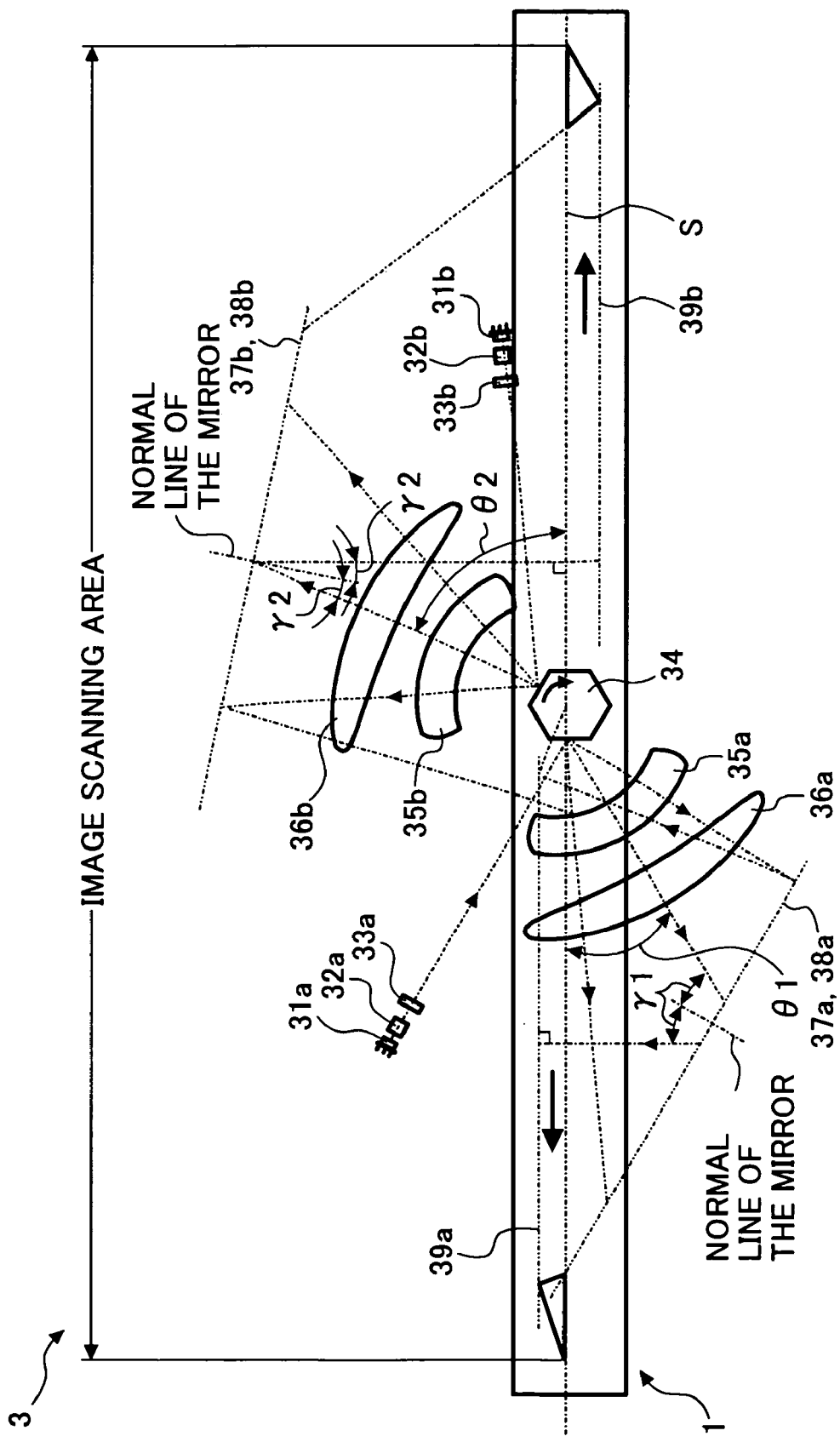
FIG. 6 is a diagram illustrating the optical axes of the fθ lenses of the two optical writing systems having different optical positions.

What is illustrated in FIG. 5 is based on optical arrangement described in FIGS. 3 and 4A to 4C and therefore is about when the angle θ1 is equal to the angle θ2 and the angle γ1 is equal to the angle γ2. However, the positional relationship between the first optical writing system A and the second optical writing system B is not limited to the relationship illustrated in FIG. 5. FIG. 6 is a diagram illustrating the axis of the fθ lens of the optical writing apparatus 3 having an optically different positioning. The optical positioning illustrated in FIG. 6 is about when the angle θ1 is not equal to the angle θ2 and the angle γ1 is not equal to the angle γ2. In this case, the scanning lengths of the first optical writing system A and the second optical writing system B are not equal. The angles θ1 and θ2 uniquely determine the angles γ1 and γ2, respectively, and the angles θ1 and θ2 determine the scanning lengths of the first optical writing system A and the second optical writing system B, respectively. Therefore, it is possible to extend the effective scanning width by setting optimal values for the angles θ1 and θ2.

As mentioned above, in the optical writing system scanning the scanned area which is divided into two in the main-scanning direction using two beams, the scanning beams of the two optical writing systems A and B are accurately connected to scan a single scanning line.

That is, ideally, the scanning lines of the scanning light beams of the first optical writing system A and the second optical writing system B coincide with the both axes to be scanned. The optical arrangement of the first optical writing system A and the second optical writing system B are adjusted after assembly of the system such that the scanning light beams of each optical writing system coincide with the both axes to be scanned S. During the initial period of use of the system, this ideal state is maintained. But due to various problems such as thermal expansion of the housing caused by a temperature rise in the image forming apparatus including the optical writing system and heat of the control device, which leads to a positional change of the mirrors and other optical elements, misalignment of the scanning position of the scanning beam of each optical writing system A and B occurs in the main-scanning direction and the sub-scanning direction. Therefore, it is preferable to detect the amount of this misalignment and automatically correct this misalignment.

In the embodiment of the present invention, as illustrated in FIG. 2, a pattern image P for detecting misalignment is formed on the photoconductor 1. The misalignment of the scanning position is detected by detecting this pattern image P with an image detection device 50 placed near the photoconductor 1. Below are descriptions of this misalignment detection.

As mentioned above, a beam irradiated by the semiconductor laser 31a or 31b of the first optical writing system A or the second optical writing system B are each collimated by the collimate lens 32a or 32b. The collimated beam is converged only to the sub-scanning direction by cylinder lenses 33a and 33b. The converged beam is rotationally deflected by the polygon mirror 34. The rotationally deflected beam scans the surface of the photoconductor 1 by way of a pair of the lenses 35a and 36a or a pair of the lenses 35b and 36b, which form an fθ lens, and the reflective mirrors 37a, 38a and 39a or 37b, 38b and 39b. The first dots written by the first optical writing system A and the second optical writing system B are connected at about the center of the photoconductor 1. The scanning beam enters into the synchronization detection units 40a and 40b and a synchronization detection signal is generated. Based on this signal, an image clock is generated.

Further, a reference mark M is formed on the photoconductor 1 as illustrated in FIG. 2. In addition, a reference mark detection sensor 60 is placed close to the photoconductor 1 and contains an optical sensor which detects the reference mark M once per rotation of the photoconductor 1. In this embodiment, the reference mark M and the reference mark detection sensor 60 are located on the side face of the photoconductor 1 but the location thereof is not limited thereto. In addition, an encoder having a reference position output signal and so on can be also used.

Figure 7:
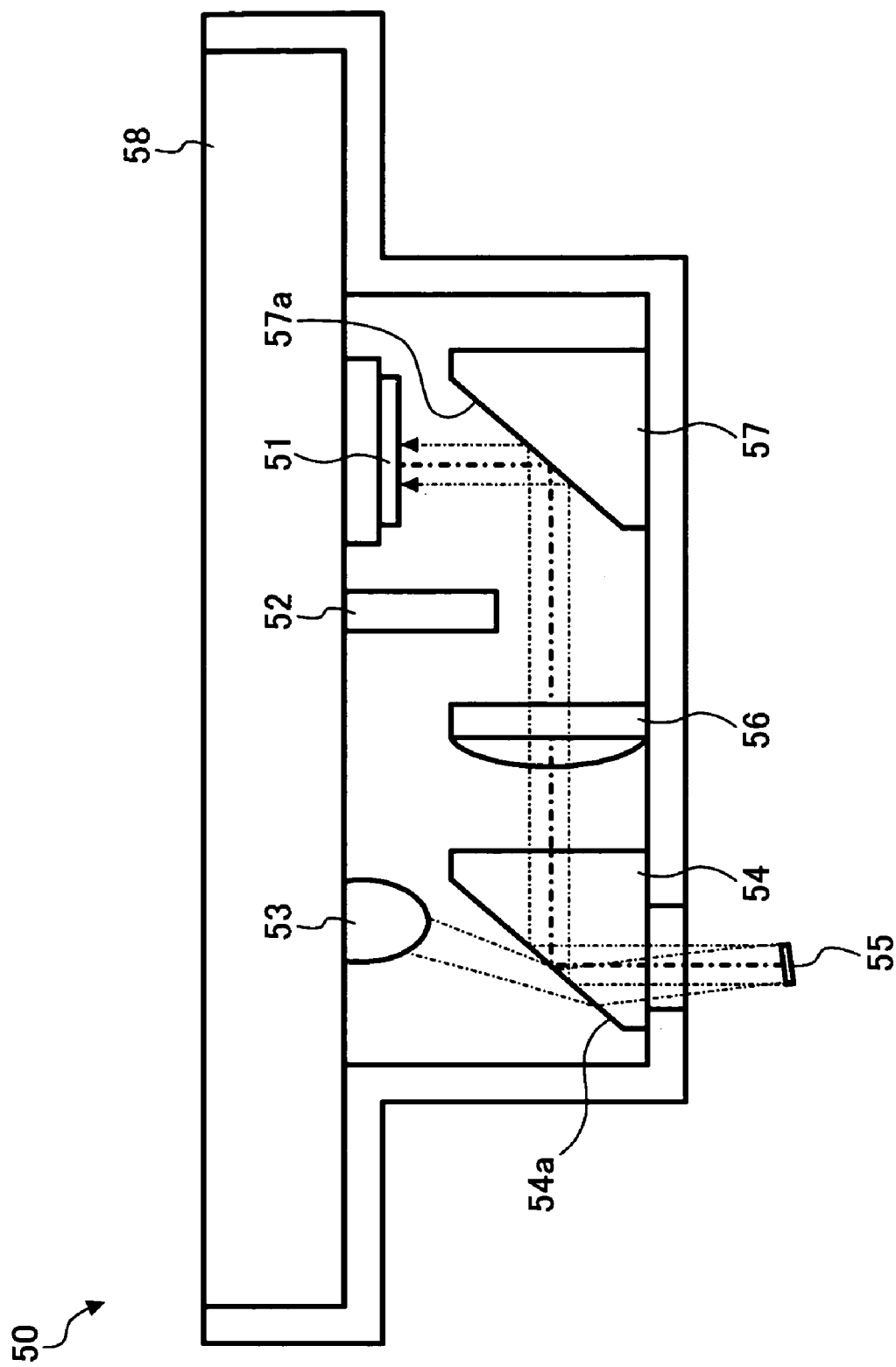
FIG. 7 is a schematic cross sectional diagram illustrating the structure of an embodiment of the image detection device of the present invention.

FIG. 7 is a schematic diagram illustrating a cross section of the structure of the image detection device 50 for detecting the pattern image P for detecting misalignment formed on the photoconductor 1. As illustrated in FIG. 7, the image detection device 50 uses a two-dimensional image sensor 51. The two-dimensional image sensor 51 is shielded by a light shielding member 52 such that the flux of light irradiated by a light source 53 which includes a single light emitting diode (LED) does not directly enter into the two-dimensional image sensor 51. The flux of light from the light source 53 is guided to the image sensor 51 as follows:

(1) the flux of light is refracted according to the refraction index thereof when the flux of light transmits a total reflection face 54a of a triangle prism 54 serving as a light guiding device as illustrated in FIG. 7;
(2) the light is guided to and reflected at a pattern face 55 on the photoconductor 1 where the pattern image P for detecting misalignment is formed;
(3) the light reflected at the pattern face 55 is totally reflected at the total reflection side 54a of the triangle prism 54; and
(4) the totally reflected light is guided to the image sensor 51, which is located on the substrate where the light source 53 is also attached, by way of an image forming lens 56 which serves as an image forming device and a reflection face 57a of a triangle prism 57 which also serves as another image forming device.

Numeral 58 denotes the substrate.

As mentioned above, by setting the light source 53 and the image sensor 51 on the same substrate, the number of parts used in the device can be reduced. As a result, the device can be miniaturized and manufactured at a low cost.

In this embodiment, the light irradiated from the light source 53 is infrared light having a wavelength of 900 nm.

Figure 8:
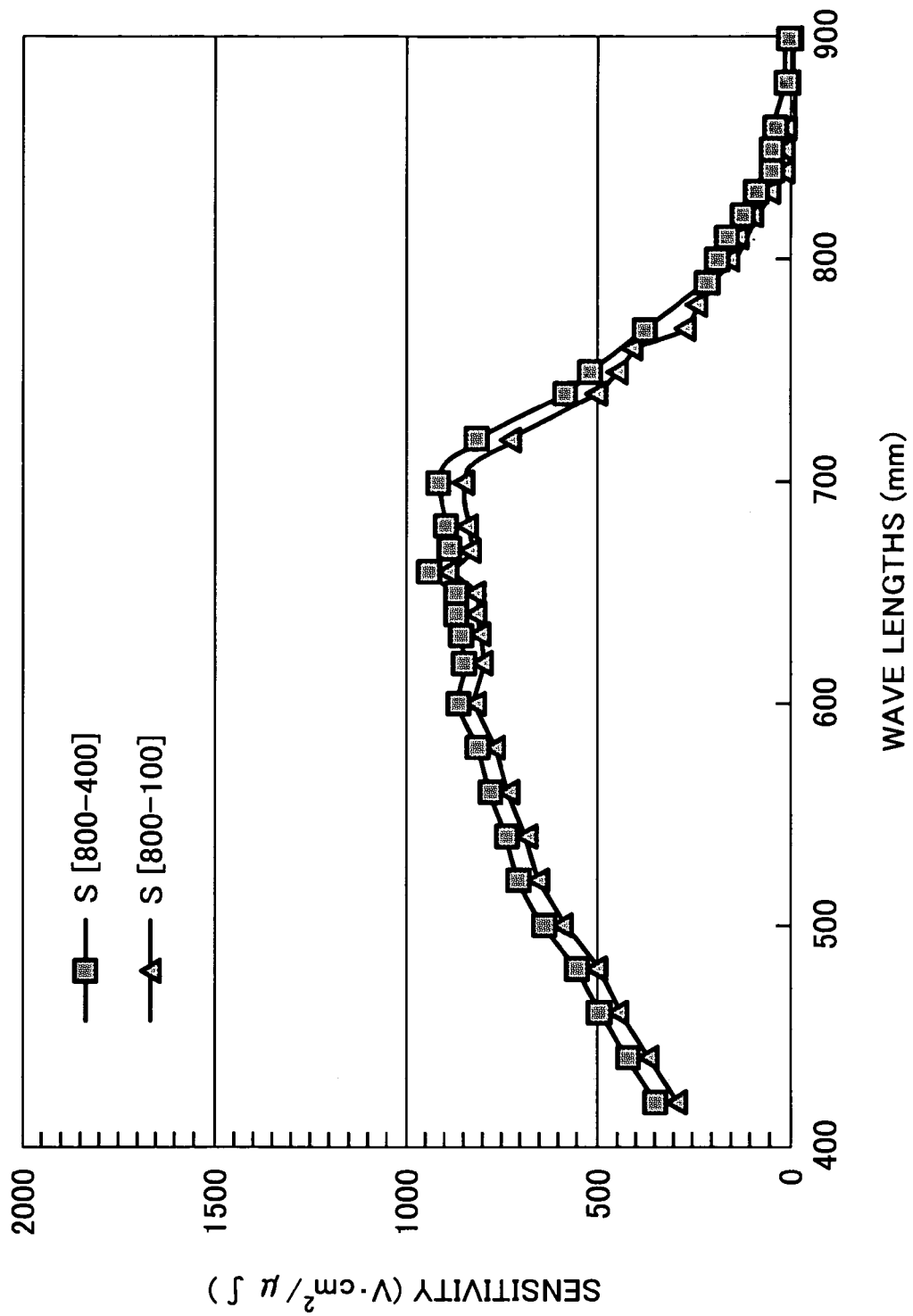
FIG. 8 is a graph illustrating the relationship between the wavelength of the light irradiating a photoconductor and the sensitivity of the photoconductor.

FIG. 8 is a graph illustrating the relationship between the wavelength of the light which irradiates the photoconductor 1 and the sensitivity of the photoconductor 1. The photoconductor 1 used is made of amorphous silicon, for example. The sensitivity of the photoconductor 1 is shown in FIG. 8 for the conditions when the electric potential of the image portion is −400V and −100V after the image is irradiated, while the electric potential of the photoconductor 1 is set to −800V. As shown in FIG. 8, the sensitivity of the photoconductor 1 has a peak at about 700 nm and is lost at 900 nm. Judging from this result, it is possible to restrain deterioration of the surface of the photoconductor 1 by using infrared light having a wavelength of 900 nm for the light source 53. The same result is obtained from the photoconductor 1 using organic materials (not shown in the graph).

Figure 9:
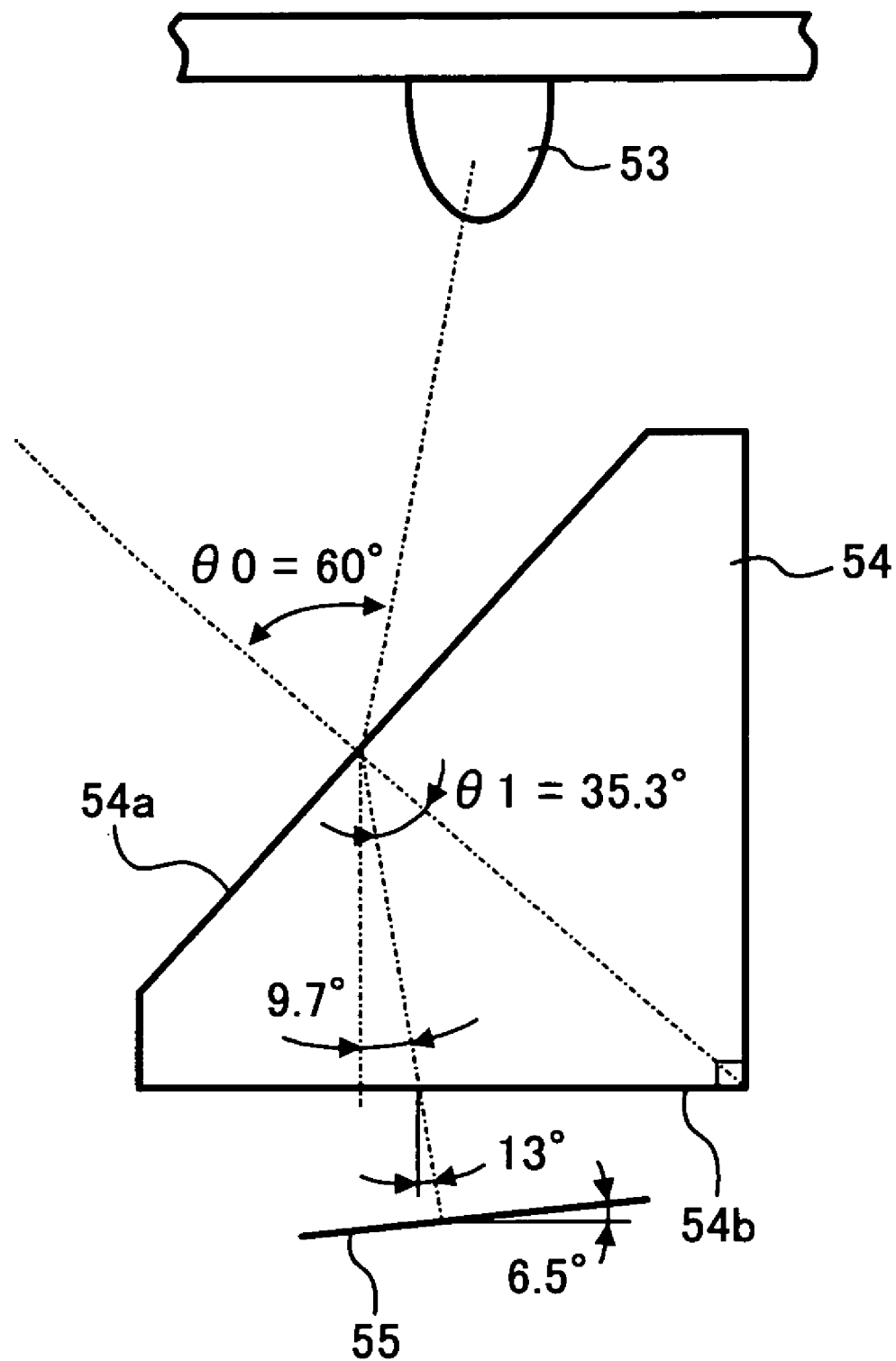
FIG. 9 is a diagram for explaining the behavior of the irradiation light incident on the triangle prism.

Irradiation light entering into the triangle prism 54 will be described with reference to FIG. 9. The flux of light from the light source 53 enters into the triangle prism 54 from the total reflection face 54a thereof. According to Snell's law, an incident angle θ0 of the incoming light from the light source 53 at the total reflection face 54a of the triangle prism 54 and an angle θ1 of the refracted light entering inside the prism 54 satisfy the following relationship: $\theta 1 = \sin^{-1}((1/n1)\sin\theta 0)$, wherein n1 represents the refraction index of the triangle prism 54. For example, when the incident angle θ0 is 60 degrees, θ1 is 35.3 degrees.

In this embodiment, the pattern surface 55 where the pattern image P for detecting misalignment is formed is the surface of the photoconductor 1, but anything which carries a visual image are allowed. For example, conveying members such as the transfer paper 9 and a transfer belt serving as an image carrier can be used.

In the case of the image detection device 50 in this embodiment, the angle formed by the bottom surface 54b of the prism 54 and the pattern surface 55 where the pattern image P is formed is half of the angle formed by a plane perpendicular to the bottom surface 54b of the prism 54 and the first light path of from the bottom surface to the pattern image P. The total reflection surface 54a of the triangle prism 54 has 45 degrees against the bottom surface 54b. Therefore, the light outgoing from the triangle prism 54 is refracted again. When the incident angle θ0 is, for example, 60 degrees, the irradiation angle at the bottom surface 54b of the triangle prism 54 is about 13 degrees. Therefore, the angle formed by the bottom surface 54b of the prism 54 and the pattern surface 55 where the pattern image P is formed is 6.5 degrees. When this angle is maintained, the main reflected light of the irradiation light is guided to the image sensor 51.

As illustrated in FIG. 7, the light reflected at the irradiated pattern surface 55 enters into the inside of the triangle prism 54 again and is perpendicularly reflected at the inside of the total reflection face 54a of the triangle prism 54. The flux of light reflected by an angle of 90 degrees transmits through the image forming lens 56 and is reflected at a reflection face 57a of a triangle prism 57 and the reflected light forms an image on the image sensor 51. The reflection face 57a of the triangle prism 57 is deposited with aluminum so as to be able to reflect light.

In this embodiment, the flux of light is reflected using the triangle prism 57 but there is no specific reason to limit to a triangle prism. Anything having a reflection surface can be used. When the optical axis is not bent and the image forming lens 56 having a focal length of about 8 mm is used, the height will be not lower than 40 mm. By this method, the height can be lowered to 20 mm.

Figure 10:
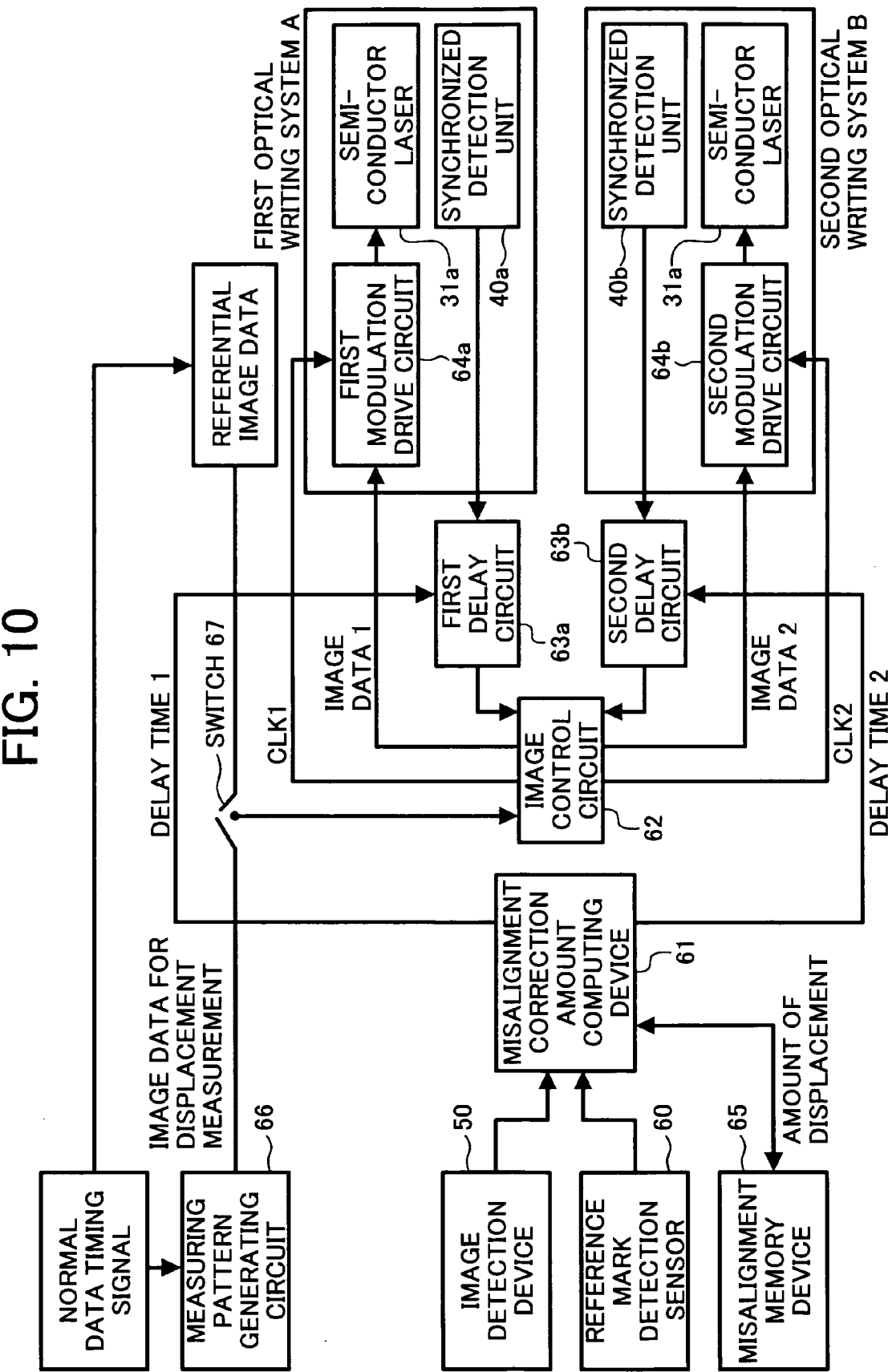
FIG. 10 is a block diagram illustrating the controller of the optical writing apparatus.

FIG. 10 is a block diagram illustrating a control portion of the optical writing apparatus 3. As illustrated in FIG. 10, the control portion has a misalignment correction amount computing device 61 containing a central processing unit (CPU) (not shown), an image control circuit 62 serving as a video board, a first delay circuit 63a, a second delay circuit 63b, a first modulation driving circuit 64a, a second modulation driving circuit 64b, a misalignment memory device 65 having a read only memory (ROM) (not shown) and a random access memory (RAM) (not shown) for memorizing a beam misalignment in the main-scanning direction and misalignment in the sub-scanning direction, a measuring pattern generating circuit 66 for generating and memorizing the pattern image P for detecting misalignment according to a predetermined setting, which is a pattern for detecting misalignment and eccentricity, and a switch 67 for selecting data for the image control circuit 62 from regular image data or image data from the measuring pattern generating circuit 66 for measuring misalignment. The image detection device 50 and the reference mark detection sensor 60 are connected to misalignment correction amount computing device 61. The synchronization detection units 40a and 40b are connected to the first delay circuit 63a and the second delay circuit 63b, respectively. The semiconductor lasers 31a and 31b are connected to the first modulation driving 64a and the second modulation driving circuit 64b, respectively.

Figure 11:
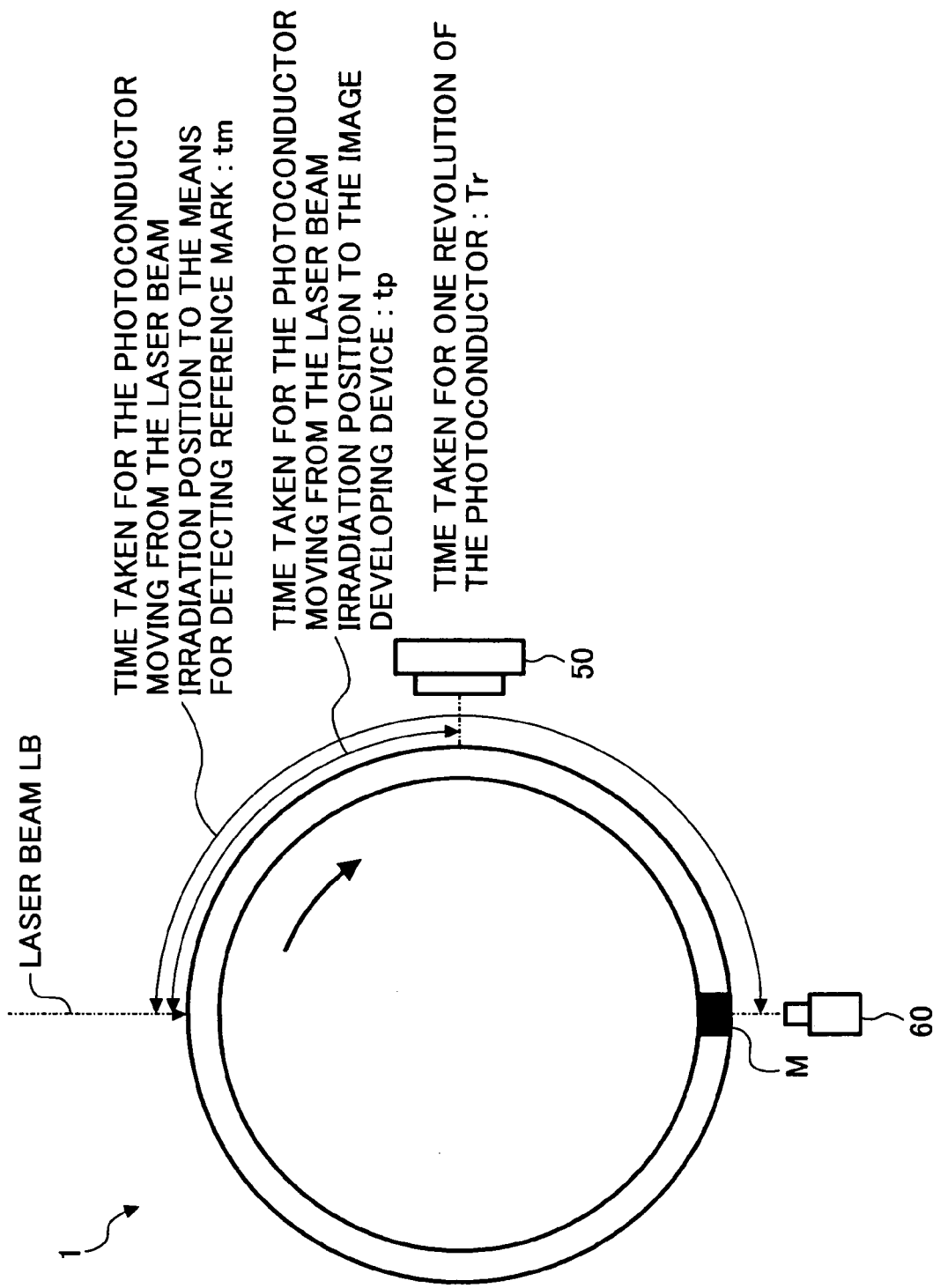
FIG. 11 is a diagram for explaining an embodiment of the positional relationship among the irradiation position of the laser beam, the image detection device, the reference mark and the reference mark detection sensor.

FIG. 11 is a diagram illustrating the relationship among the location of irradiation of the laser beam LB, the image detection device 50 and the reference mark detection sensor 60. As illustrated in FIG. 11, the laser beam LB emitted from the semiconductor lasers 31a and 31b irradiates the photoconductor 1 from directly above and forms a latent image thereon, i.e., writing the pattern thereon. This latent image is visualized by a developing device (not shown), which is located at a downstream side of the photoconductor 1 along the rotation direction thereof based on the location of irradiation of the laser beam LB. The thus visualized toner image is detected by the image detection device 50 as the pattern image P for detecting misalignment. In FIG. 11, the laser beam LB irradiates the photoconductor 1 from directly above but there is no reason to limit to from directly above. In this drawing, $t_p$ represents a time taken from the location of irradiation of the laser beam LB to the image detection device 50 when the photoconductor 1 rotates. In addition, the reference mark detection sensor 60 for detecting the rotation location of the photoconductor 1 is placed at a downstream side of the image detection device 50 based on the rotation direction of the photoconductor 1. Characters $t_m$ represent a time taken when the photoconductor 1 rotates from the location of irradiation of the laser beam LB to the reference mark detection sensor 60. $T_r$ represents a time necessary for one rotation of the photoconductor 1.

An output (reference mark signal) from the reference mark detection sensor 60 functioning as the location detection sensor of the rotation location on the photoconductor 1 is output once per rotation of the photoconductor 1. Thus, the laser beam LB starts writing an image $T_r$–$t_m$ after the reference mark signal of the photoconductor 1 is detected. In this case, the time taken before the laser beam LB starts writing an image is $T_r$–$t_m$ but there is no specific reason to limit to $T_r$–$t_m$. The point is that the rotation location of the photoconductor 1 synchronizes with the output of an image.

Figure 12:
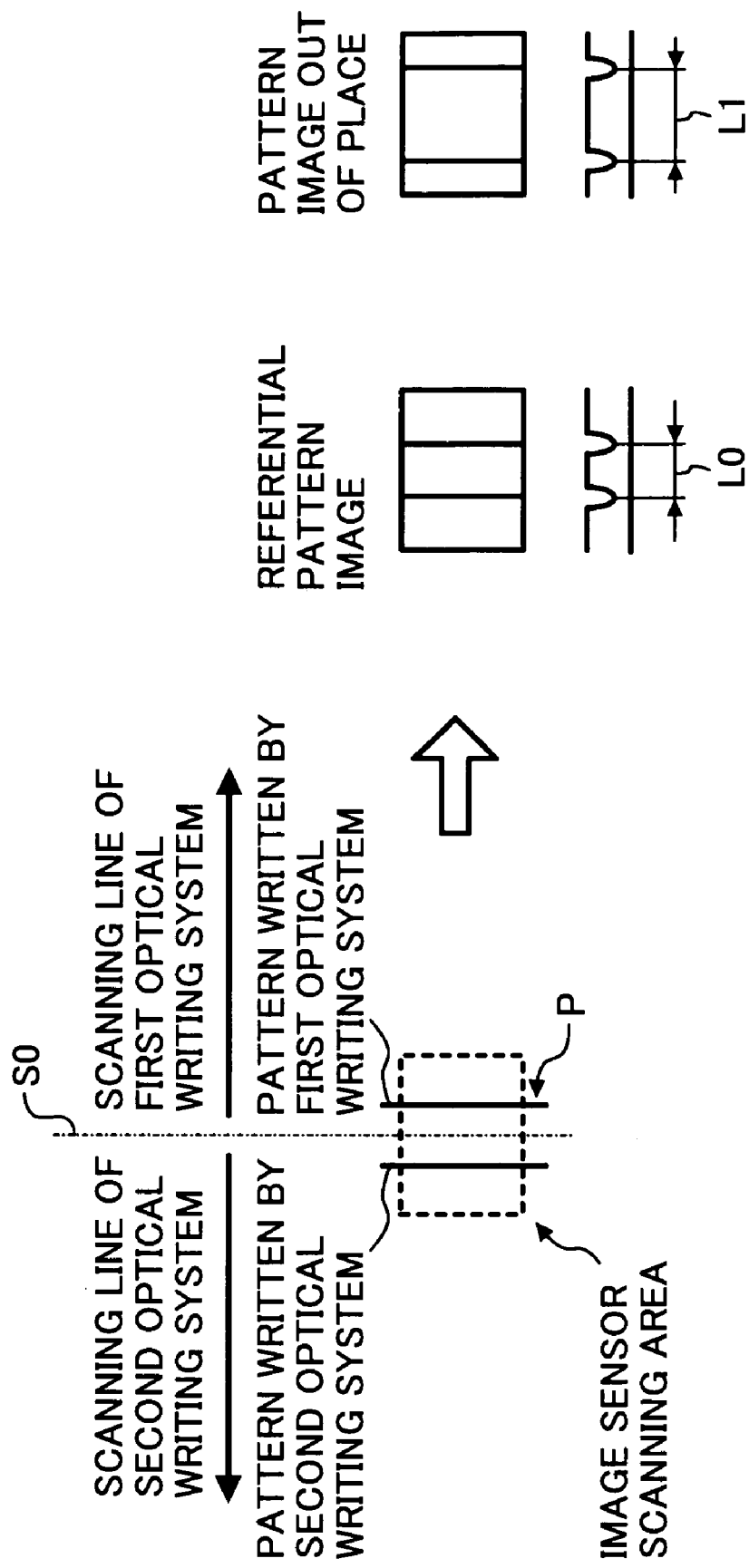
FIG. 12 is an explanatory diagram illustrating an example of the pattern image used for detecting the light beam misalignment in the main scan direction.

With regard to misalignment detection processes performed at the misalignment amount correction computing device 61, the detection process of the beam misalignment in the main-scanning direction will be described first. FIG. 12 is a diagram illustrating an example of the line patterns for detecting the beam misalignment in the main-scanning direction. As illustrated in FIG. 12, in the detection of the beam misalignment in the main-scanning direction, two independent parallel lines which are perpendicular to the main-scanning direction, i.e., the sub-scanning direction, are formed as the pattern image P for detecting misalignment in the image scanning area of the image sensor 51. The theoretical interval between the lines at this point is represented by L0.

Regarding the light beam misalignment detection in the main-scanning direction, the outputs from the image sensor 51 are aggregated in the sub-scanning direction to obtain single dimension data. The interval between the peaks or the minimum values of the lines is measured to obtain the actual interval thereof. If there is no misalignment, the line interval measured is L0. If there is misalignment in the main-scanning direction, the line interval changes and is L1 as illustrated in FIG. 12. The amount of the misalignment ΔL is obtained by the following calculation: ΔL=L1-L0. The two lines are formed in the direction perpendicular to the main-scanning direction, i.e., the sub-scanning direction. Therefore, the misalignment in the sub-scanning direction caused by irregularity in the rotation speed of the photoconductor 1, optical misalignment and so on does not affect the measurement of the detection of the misalignment in the main-scanning direction. As a result, the measurement in the main-scanning direction is performed with high precision. In addition, the burdens on the computing device for detecting the location of the beam and the cost are reduced. This is how the image detection device in the main-scanning direction functions.

Figure 13:
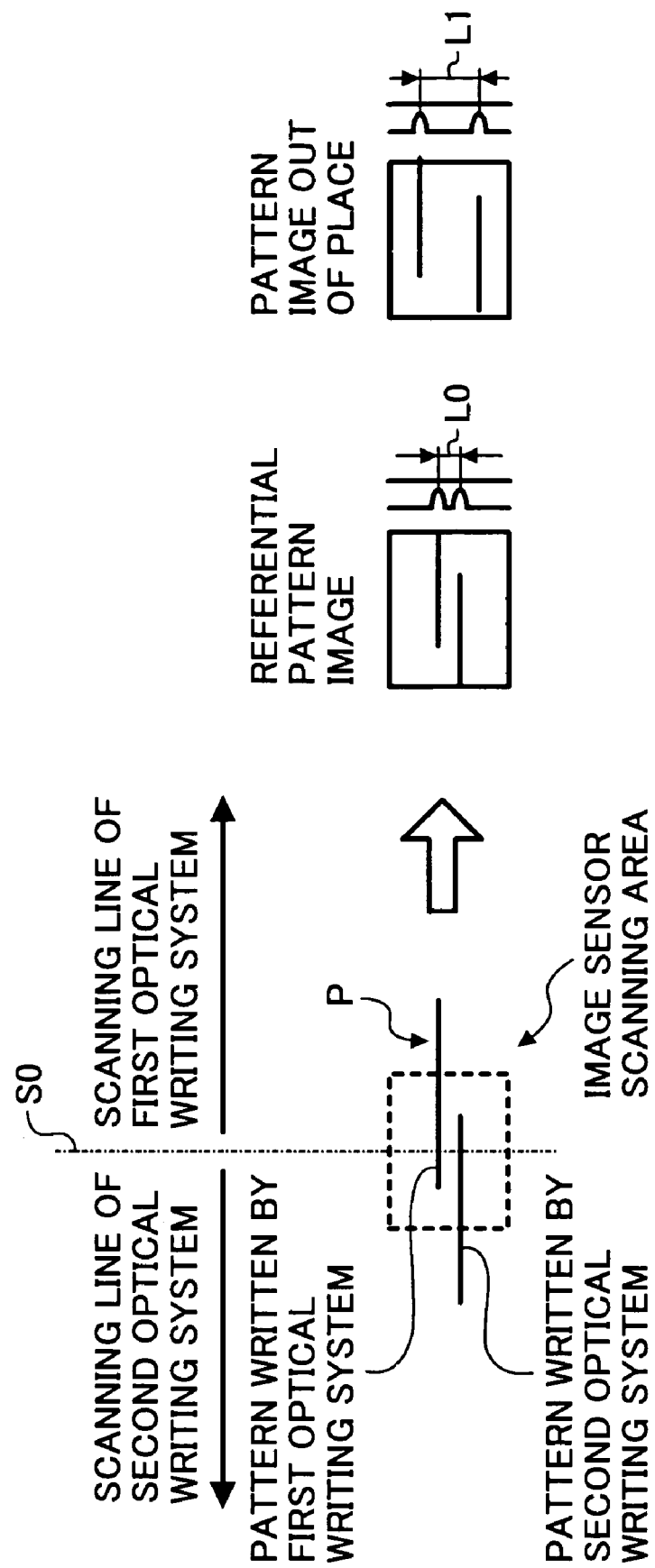
FIG. 13 is a diagram illustrating an example of the pattern image used for detecting the light beam misalignment in the sub-scanning direction.

Next, the detection process of the light beam misalignment in the sub-scanning direction will be described. FIG. 13 is a diagram illustrating an example of the line patterns for detecting the beam misalignment in the sub-scanning direction. As illustrated in FIG. 13, in the detection of the beam misalignment in the sub-scanning direction, two independent lines which are parallel to the main-scanning direction are formed as the pattern image P for detecting misalignment in the image scanning area of the image sensor 51. The theoretical interval between the lines at this time is represented by L0.

Regarding the light beam misalignment detection in the sub-scanning direction, the outputs of the image sensor 51 are aggregated in the main-scanning direction to obtain single dimension data. The interval between the peaks or the minimum values of the lines is measured. If there is no misalignment, the line interval measured is L0. If there is misalignment in the sub-scanning direction, the line interval changes and is L1 as illustrated in FIG. 13. The amount of the misalignment ΔL is obtained by the following calculation: ΔL=L1–L0. The two lines are formed in the direction parallel to the main-scanning direction. Therefore, the misalignment in the main-scanning direction caused by magnification power error of the optical system and so on does not affect the measurement of the detection of the misalignment in the sub-scanning direction. As a result, the measurement in the sub-scanning direction is performed with high precision. In addition, the burden on a computing means for determining the location of the beam is alleviated and the cost is reduced. This is how the image detection device in the sub-scanning direction functions.

As stated above, measuring can be performed with high precision by detecting the light beam misalignment in the main-scanning direction and in the sub-scanning direction separately.

Figure 14:
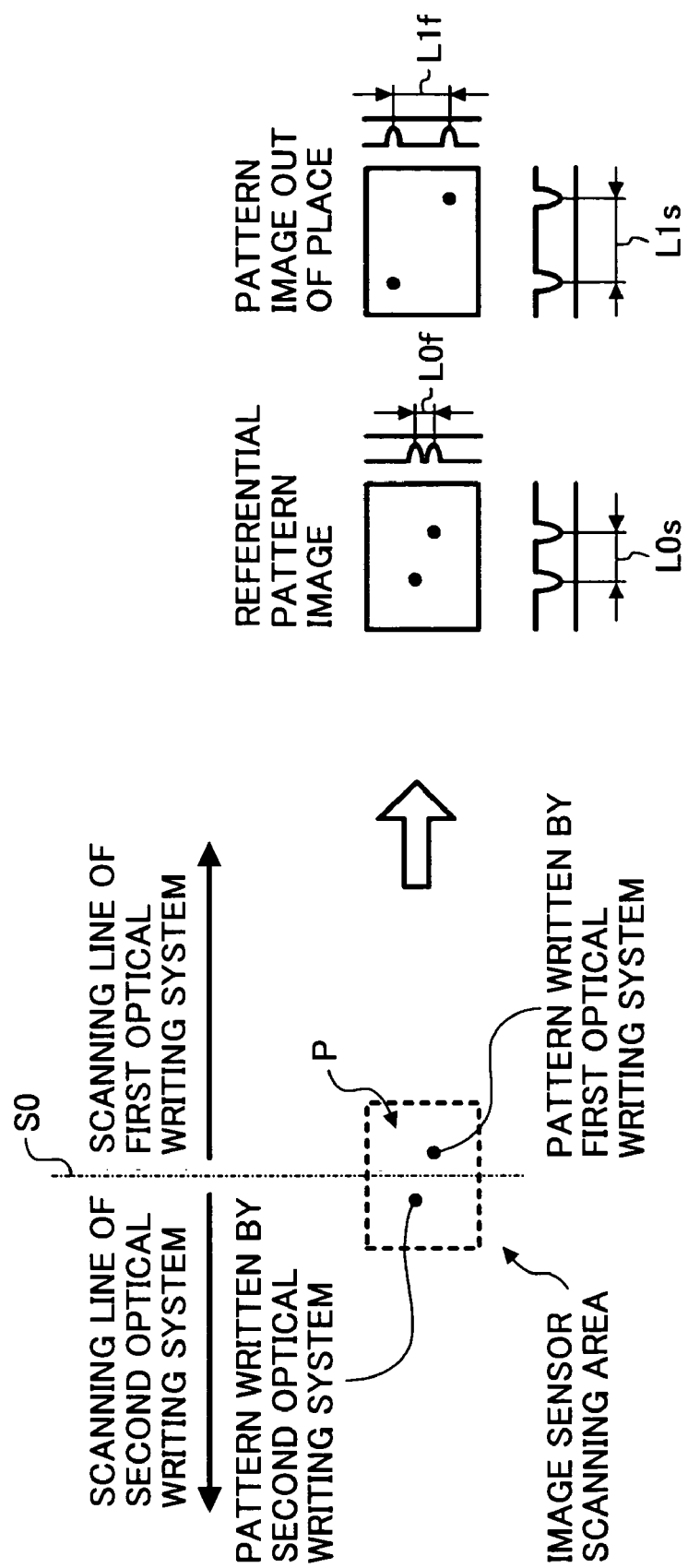
FIG. 14 is an explanatory diagram illustrating an example of the patterns for detecting the light beam misalignment in both the main and scanning the scan directions at the same time.

It is also possible to detect the beam misalignment in the main-scanning direction and the sub-scanning direction at the same time. The detection process of the beam misalignment in the main-scanning direction and in the sub-scanning direction at the same time will be described next. FIG. 14 is a diagram illustrating an example of the pattern image for detecting the beam misalignment in the main-scanning direction and the sub-scanning direction at the same time. As illustrated in FIG. 14, in the detection of the beam misalignment in the main-scanning direction and in the sub-scanning direction at the same time, two independent dots are formed as the pattern image P for detecting misalignment as the result of aggregating the output data of the image sensor 51 in the main-scanning direction and in the sub-scanning direction. The size of the dot is determined depending on the sensitivity of the image sensor 51. The intervals between the two dots in the main-scanning direction and in the sub-scanning direction are represented by $L0_s$ and $L0_f$, respectively.

Regarding the light beam misalignment detection in the main-scanning direction and in the sub-scanning direction, each output data of the image sensor 51 is aggregated in the main-scanning direction and in the sub-scanning direction to obtain single dimension data. The intervals between the peaks or the minimum values of the dots are measured. If there is no misalignment, the interval between the dots measured is $L0_s$. If there is misalignment in the main-scanning direction, the interval between the dots changes and is $L1_s$ as illustrated in FIG. 14. The amount of the misalignment is obtained by the following calculation: $\Delta L = L1_s - L0_s$. If there is misalignment in the sub-scanning direction, the interval between the two dots changes and is $L1_f$ as illustrated in FIG. 14. The amount of the misalignment $\Delta L$ is obtained by the following calculation: $\Delta L = L1_f - L0_f$.

In the detection process mentioned above, the signal to noise (S/N) ratio of the output is inferior in some degree to those of the pattern image P for detecting misalignment having line forms as illustrated in FIGS. 12 and 13. However, it is possible to detect the peak so that the detection precision degree does not greatly deteriorate. This is how the image detection device in the main-scanning direction and in the sub-scanning direction at the same time functions.

Since misalignments in the main-scanning direction and in the sub-scanning direction are detected at the same time, it is possible to increase the speed of processing.

Figure 15:
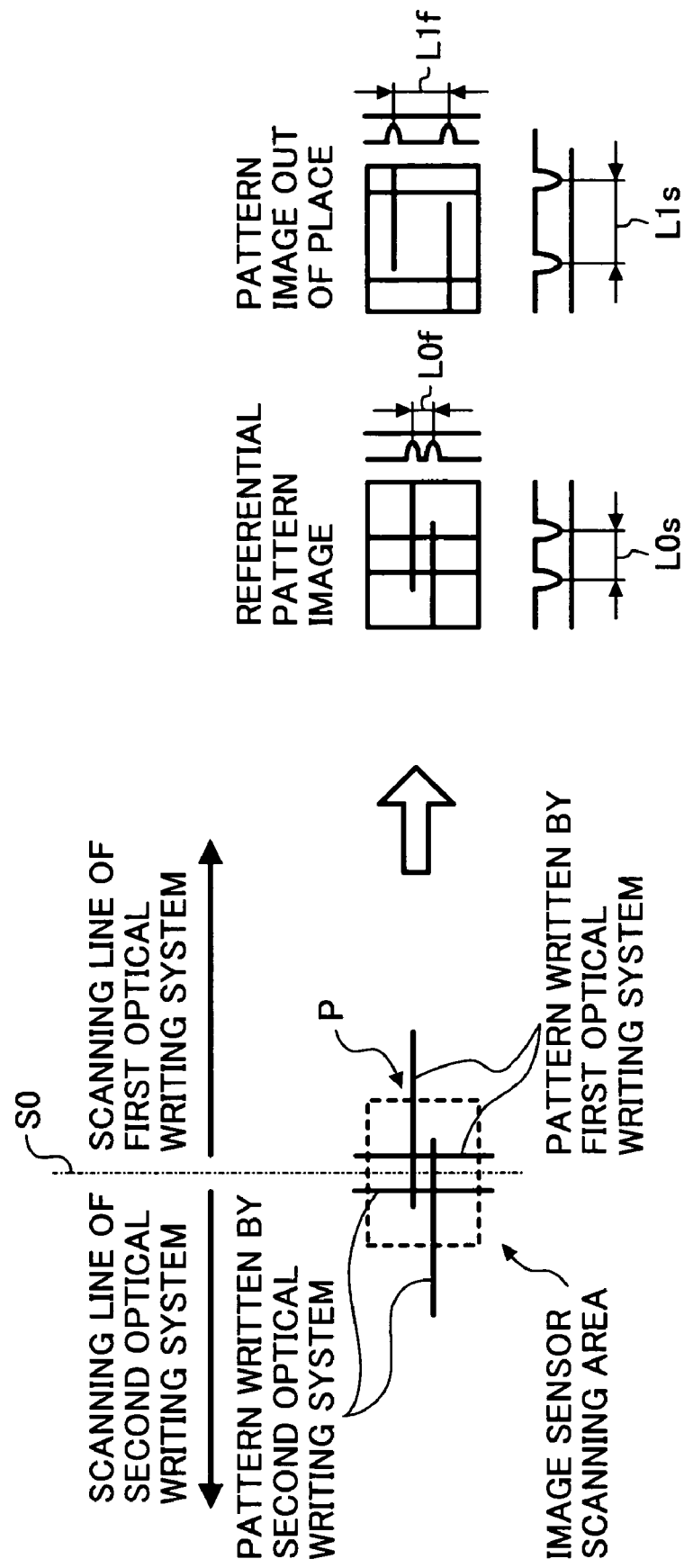
FIG. 15 is an explanatory diagram illustrating an example of the line patterns for detecting the beam misalignment in both the main and the scan directions at the same time.

In addition, when the light beam misalignment in the main-scanning direction and in the sub-scanning direction are detected at the same time, it is possible to detect the light beam misalignment in the main-scanning direction and in the sub-scanning direction using the pattern image P for detecting misalignment having line forms as illustrated in FIG. 15. The detection method used is identical to the detection process illustrated in FIG. 14.

Each light beam misalignment in the main-scanning direction and in the sub-scanning direction detected as mentioned above is memorized by the misalignment memory device 65.

Figure 16:
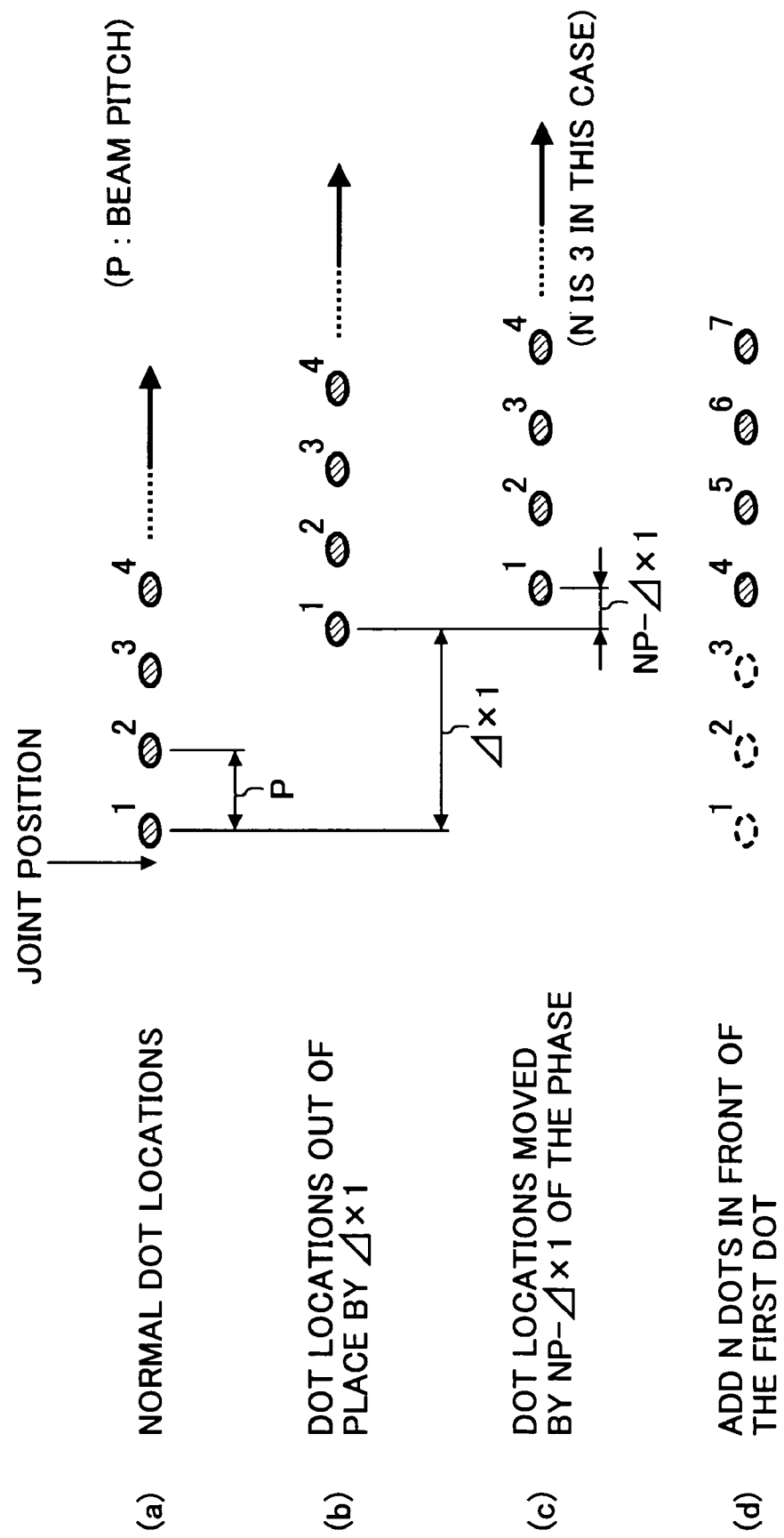
FIG. 16 is a diagram for explaining the method of correcting the light beam misalignment in the main scan direction.

Next, the method for correcting the beam misalignment in the main-scanning direction will be described. FIG. 16 is a diagram illustrating the correction method of the beam misalignment in the main-scanning direction. FIG. 16 illustrates an example having a misalignment amount of $\Delta X1$ in the main direction. Regular dot positions, which have no misalignment, are illustrated in row (a). Dot positions having an amount of misalignment of $\Delta X1$ are shown in row (b). When the dots are shifted by $\Delta X1$, a phase of the pixel clock equivalent to the following length: $N \times P - \Delta X1$, is shifted as illustrated in row (c). In this length, N represents the minimum integer which satisfies the following relationship: $N \times P > \Delta X1$, and P represents the pitch interval of the beam. By shifting the phase, the positions of the dot arrays having an amount of misalignment of $\Delta X1$ are shifted such that the first dot position in the main-scanning direction illustrated in row (a) is shifted to the fourth dot in the regular dot positions illustrated in row (c). Next, as illustrated in row (d), N (representing 3 in this case) dots are added in front of the first dot and further image data are shifted N dots. Practically, this is equal to changing a clock number Ng between the synchronization detection signal and the starting position of writing, to Ng−N. The processing mentioned above is performed for the first optical writing system A and the second optical writing system B. The joint point in the main-scanning direction can be set to the predetermined location by controlling the writing timing with the image control circuit 62. This is how the misalignment correction means functions.

Figure 17A:
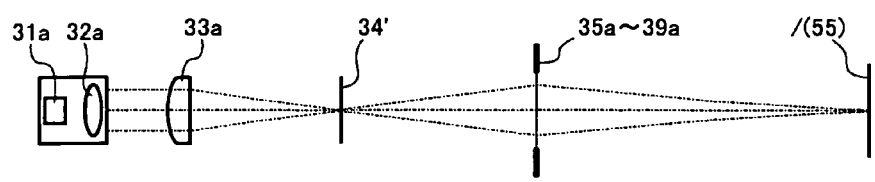
FIGS. 17A, 17B and 17C are diagrams illustrating the method of correcting the light beam misalignment in the sub-scanning direction.
Figure 17B:
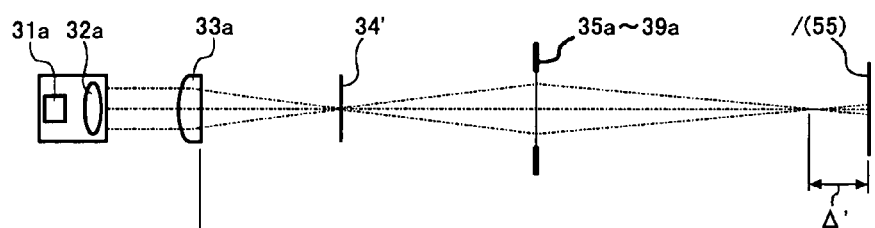
Figure 17C:
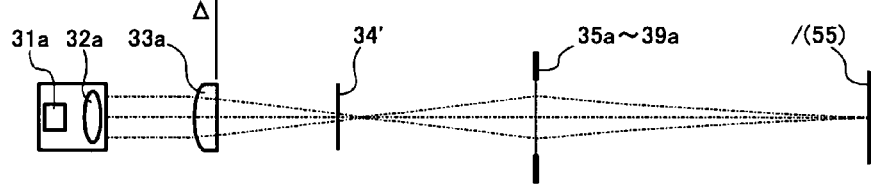

Next, the method for correcting the beam misalignment in the sub-scanning direction will be described with reference to the first optical writing system A. FIGS. 17A to 17C are diagrams illustrating the correction method of the beam misalignment in the sub-scanning direction. FIG. 17A is a diagram illustrating the conjugation relationship between the deflection reflection surface and the scanned surface in the sub-scanning direction. Numeral 34' denotes a deflection reflection surface of the polygon mirror 34. FIG. 17B illustrates a state in which the formed image in the sub-scanning direction is shifted in amount of $\Delta'$ due to errors such as working error and assembly error. In this case, as illustrated in FIG. 17C, the image can be focused on the pattern surface 55 of the photoconductor 1 functioning as the scanned surface by moving the cylinder lens 33a in amount of $\Delta$, which satisfies the following relationship: $\Delta' = \beta^2 \times \Delta$, wherein $\beta$ represents the lateral magnification power of the lens 35a and 36a in the sub-scanning direction.

Light beam misalignment in the sub-scanning direction can be corrected by performing the processing mentioned above for the first optical writing system A and the second optical writing system B. This is how the misalignment correction means functions.

In addition, other usable methods of correcting the beam misalignment in the sub-scanning direction are disclosed in JOP Nos. 2000-267027 and 2001-341348.

The light irradiated from the light source 53 transmits through the prism 54 and is reflected at the pattern surface 55. The reflected light passes on the second light path changed by the prism 54 to the image sensor 51. Since the second light path is changed in the middle thereof, it is possible to provide a miniaturized image detection device.

Further, since the angle formed by the bottom surface 54b of the prism 54 and the pattern surface 55 where the pattern image P is formed is half of the angle formed by a plane perpendicular to the bottom surface 54b of the prism 54 and the first light path of from the bottom surface to the pattern image P, the optical axis of the light reflected from the pattern surface 55 irradiated by the light source 53 coincides with that of the image focusing device. Therefore the reflected light from the pattern surface 55 on the photoconductor 1 is securely guided to the image sensor 51. Therefore, the signal to noise (S/N) of the image portion to a non-image portion surrounding the image portion is high so that recognition precision is improved. In addition, only a single light source, i.e., the light source 53, is required for irradiation and thus the cost can be reduced.

The second embodiment of the present invention will be described with reference to FIG. 18. Regarding the same portions of the second embodiment as those of the first embodiment, the same reference numerals are used and the descriptions thereof are omitted. The digital photocopier (an image forming apparatus) of this embodiment has a different image detection device from the image detection device 50 included in the digital photocopier 100 of the first embodiment.

Figure 18:
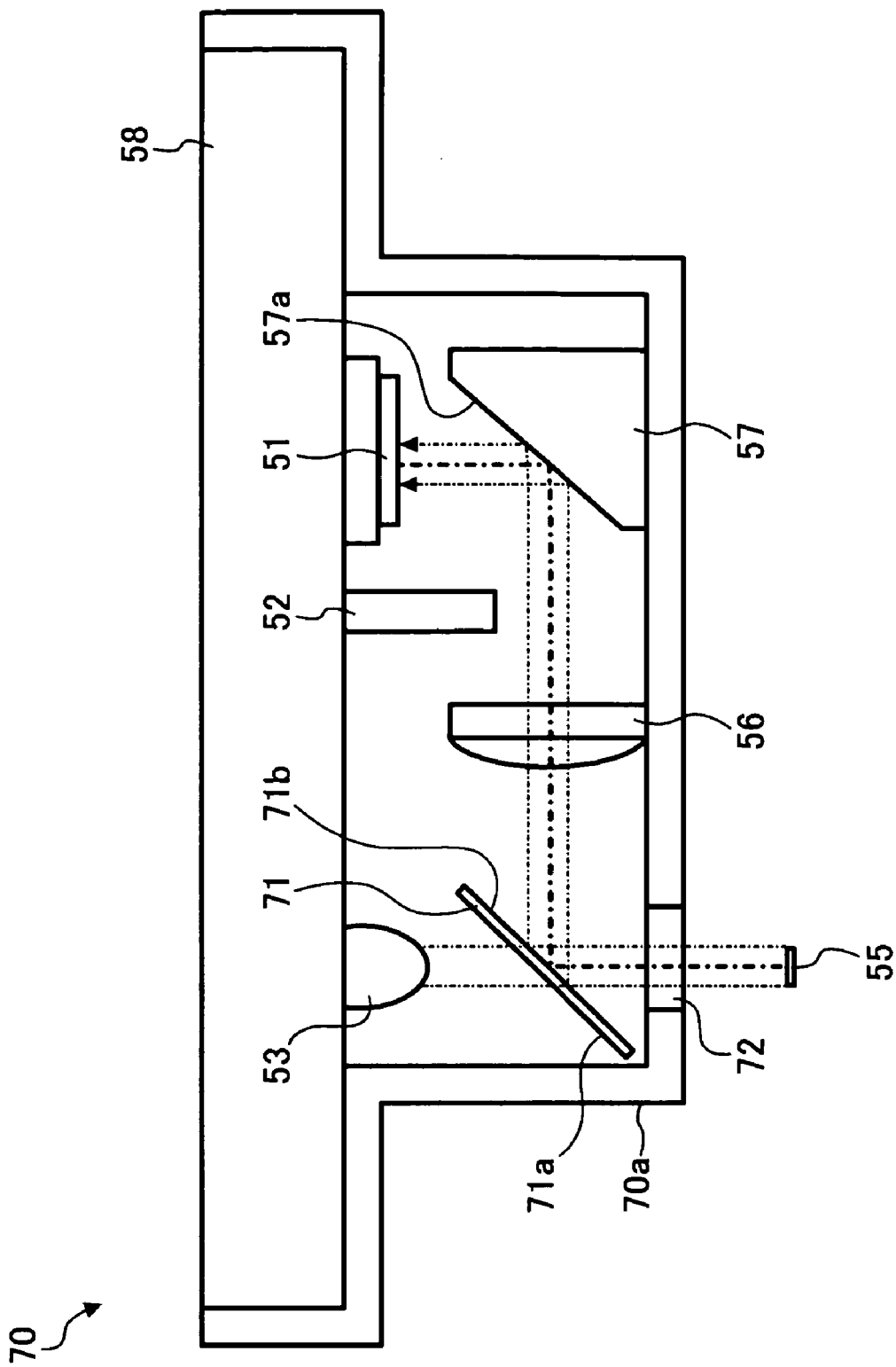
FIG. 18 is a schematic diagram illustrating the cross section of the image detection device contained in the digital photocopier of the second embodiment of the present invention.

FIG. 18 is a schematic cross sectional diagram illustrating the structure of an image detection device 70 of this embodiment. As illustrated in FIG. 18, the image detection device 70 uses a two-dimensional image sensor 51. The light shielding member 52 shields the flux of the light from the light source which includes a single liquid emitting diode (LED) in order for the image sensor 51 not to directly receive the flux of the light from the light source. The flux of the light from the light source 53 enters into a half mirror 71, which is a light guiding means, from one side 71a of the half mirror 71. The half mirror 71 is tilted 45 degrees. About a half of the flux of the light is reflected at the other side 71b of the half mirror 71 and is guided to the pattern surface 55 of the photoconductor 1 where the pattern image P for detecting misalignment is formed. The light outgoing from the half mirror 71 is substantially perpendicularly incident on the photoconductor 1. The incident light is substantially perpendicularly reflected at the pattern surface 55 of the photoconductor 1. About a half of the flux of the reflected light from the pattern surface 55 is reflected at the side 71b of the half mirror 71 and guided to the image sensor 51 located on the substrate where the light source 53 is set after transmitting through the image forming lens 56 and the reflecting surface 57a of the triangle prism 57.

Either side 71a or 71b can be a half mirror face. To the other side of the half mirror side, an anti-reflecting coating is applied to prevent double reflection and stray light. Thereby, about a half of the light which has transmitted straight through the half mirror side is not reflected and thereby the stray light is not incident on the image sensor 51. Therefore, the precision level of misalignment detection is improved.

As illustrated in FIG. 18, a dust-control glass 72 functioning as a dust-control means is provided at a location in the light path of a housing 70a of the image detection device 70 and is between the half mirror 71 and the pattern surface 55 of the photoconductor 1. When the light from the light source 53 irradiates toner which is not fixed yet on the pattern surface 55 of the photoconductor 1 and the unfixed toner loses its charge and then scatters, the dust-control glass 72 prevents the image detection device 70 from accumulating dust. In addition, the dust-control glass 72 can be tilted against the pattern surface 55 of the photoconductor 1 such that the dust-control glass 72 does not reflect the reflected light from the pattern surface 55 of the photoconductor 1.

The reflected light from the pattern surface 55 irradiated by the light from the light source 53 transmitting through the half mirror 71 is guided to the image sensor 51 by way of the second light path which is changed by the half mirror 71. Since the image focusing light path is changed in the middle thereof, it is possible to provide a miniaturized image detection device.

Further, as mentioned above, the half mirror 71 perpendicularly irradiates the light from the light source 53 on the pattern surface 55 of the photoconductor 1, where the pattern image P for detecting misalignment is formed, and changes the second light path for guiding the reflective light from the pattern surface 55 irradiated to the image sensor 51. Consequently, the optical axis of the light which is irradiated by the light source 53 and reflected from the pattern surface 55 coincides with that of the image focusing device. Therefore the light reflected from the pattern surface 55 of the photoconductor 1 is securely guided to the image sensor 51. Therefore, the signal to noise (S/N) ratio of the image portion to a non-image portion surrounding the image portion is high so that recognition precision is improved. In addition, only a single light source, i.e., the light source 53, is required for irradiation and thus the cost can be reduced.

Figure 19:
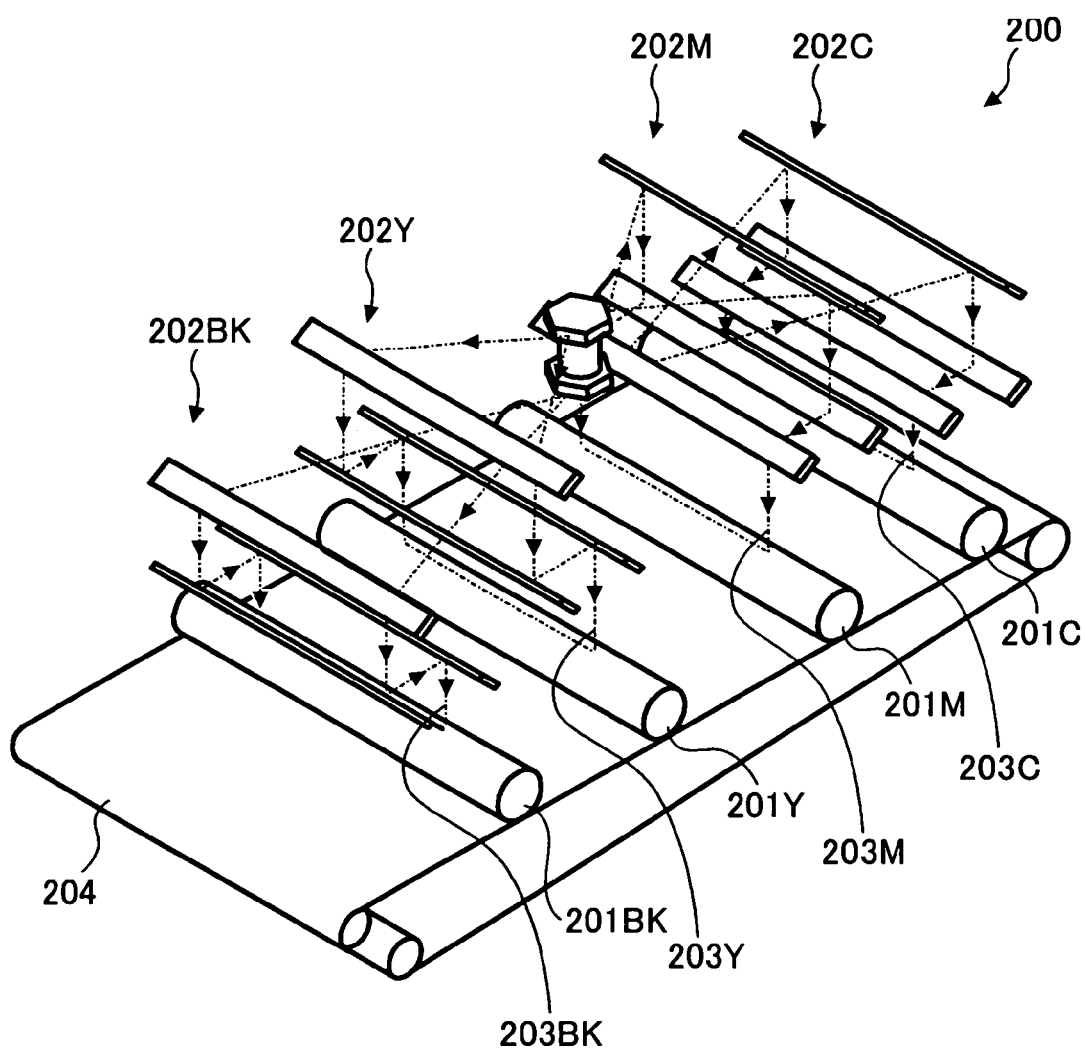
FIG. 19 is a perspective diagram illustrating another embodiment of the image forming apparatus of the of the present invention.
Figure 20:
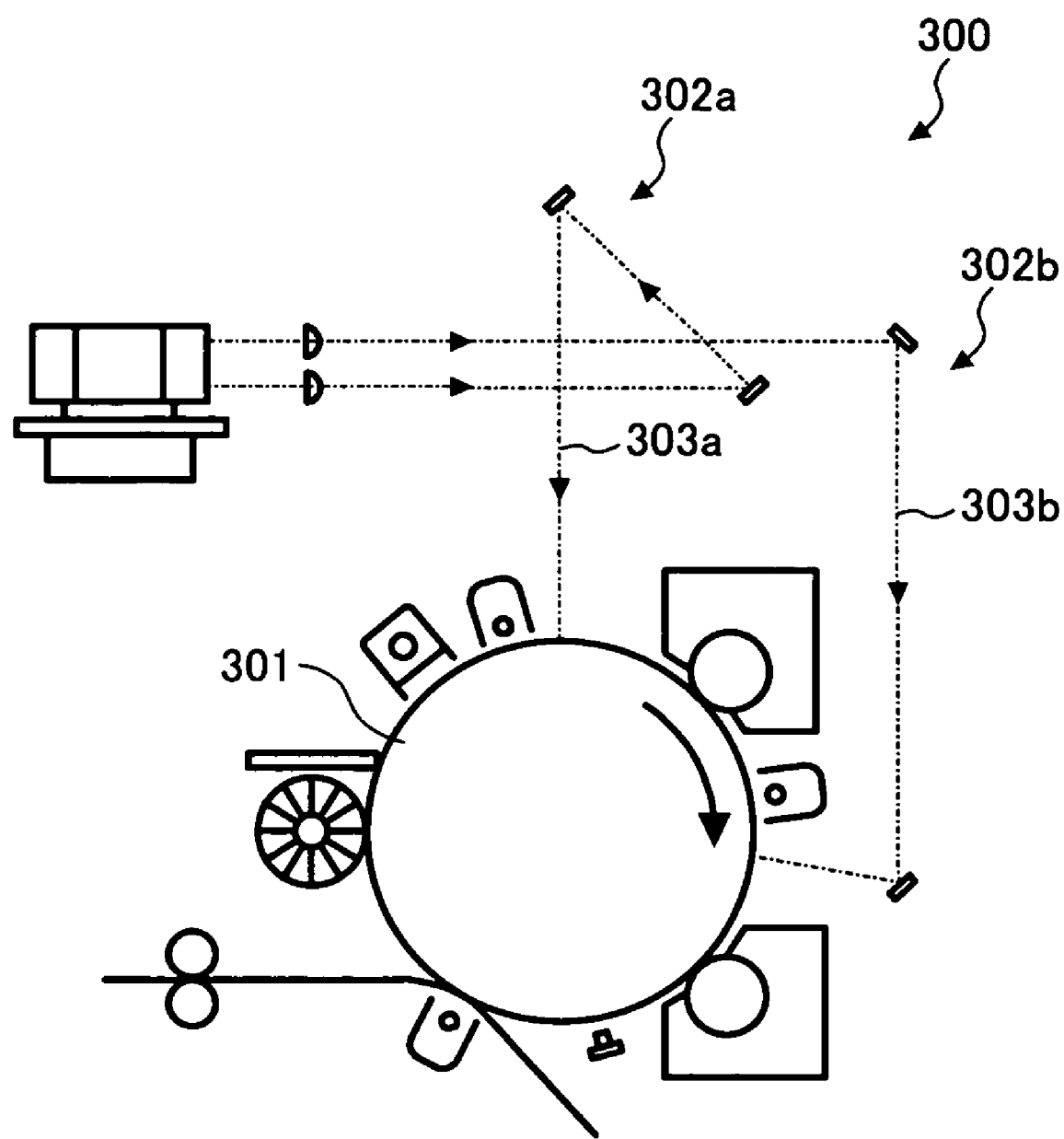
FIG. 20 is a cross sectional diagram illustrating yet another embodiment of the image forming apparatus.

For the image forming apparatus in each embodiment, a printer engine 101, which forms a single-line latent electrostatic image in the main-scanning direction on the sole photoconductor 1 using light beams irradiated by the multiple optical writing systems A and B, is used but there is no specific reason to limit thereto. For example, as illustrated in FIG. 19, an image forming apparatus 200 disclosed in JOP No. 6-18796, which is generally referred to as a tandem printer engine, can be used. The image forming apparatus 200 obtains a multi-color image by: irradiating multiple image bearing members of photoconductors 201BK, 201Y, 201M and 201C with respective laser beams of 203BK, 203Y, 203M and 203C emitted by multiple optical writing systems of 202BK, 202Y, 202M and 202C to form latent electrostatic images; developing the respective images with respective color toners; and overlaying the respective images on a transfer material 204 such as a transfer belt and a transfer paper. In addition, as illustrated in FIG. 20, an image forming apparatus 300 disclosed in JOP No. 6-1002, can be also used. The image forming apparatus 300 obtains a multi-color image by: irradiating a sole photoconductor 301 with respective laser beams of 303a and 303b emitted by multiple optical writing systems 303a and 303b to form latent electrostatic images on the photoconductor 301; and developing the respective images with respective color toner.

This document claims priority and contains subject matter related to Japanese Patent Application No. 2003-119343, filed on Apr. 24, 2003, the contents of which are incorporated herein by reference.

Having now fully described embodiments of the present invention, it will be apparent to one of ordinary skill in the art that many changes and modifications can be made thereto without departing from the spirit and scope of embodiments of the invention as set forth herein.

What is claimed as new and desired to be secured by Letters Patent of the United States is:

1. An image detection device comprising:
   a light source configured to irradiate a pattern image with a light beam;
   an image sensor;
   a light guiding device located on a first light path from the light source to the pattern image and configured to guide the light beam irradiated by the light source to the pattern image and further guide a light reflected from the pattern image to the image sensor along a second light path, the first light path including only the light guiding device and not including any image focusing device;
   an image focusing device located on the second light path from the light guiding device to the image sensor and configured to focus the light reflected from the pattern image on the image sensor; and
   a housing configured to contain the light source, the image sensor, the light guiding device and the image focusing device,
   wherein an optical axis of the light reflected from the pattern image coincides with an optical axis of the image focusing device, and a bottom surface of a prism in the light guiding device and a surface on which the pattern image is formed make a first angle that is half of a second angle made by a plane perpendicular to the bottom surface of the prism and the first light path from the bottom surface to the pattern image.

2. The image detection device according to claim 1, further comprising:
   a dust control device located between the light guiding device and the pattern image to prevent the light guiding device from accumulating dust.

3. The image detection device according to claim 1, wherein the light beam irradiated by the light source includes infrared light.

4. The image detection device according to claim 1, wherein the light source and the image sensor are set on a substrate.

5. An image detection device comprising:
   a light source configured to irradiate a pattern image with a light beam;

an image sensor;

a light guiding device located on a first light path from the light source to the pattern image and configured to guide the light beam irradiated by the light source to the pattern image and further guide a light reflected from the pattern image to the image sensor along a second light path;

an image focusing device located on the second light path from the light guiding device to the image sensor and configured to focus the light reflected from the pattern image on the image sensor; and a housing configured to contain the light source, the image sensor, the light guiding device and the image focusing device, wherein an optical axis of the light reflected from the pattern image coincides with an optical axis of the image focusing device, wherein the light guiding device includes a prism, and wherein a bottom surface of the prism and a surface on which the pattern image is formed makes a first angle that is half of a second angle made by a plane perpendicular to the bottom surface of the prism and the first light path from the bottom surface to the pattern image.

6. An optical writing apparatus comprising:

at least two optical writing systems which are configured to irradiate an image bearing member with respective light beams while scanning the light beams to form a visual image on the image bearing member;

an image detection device, comprising
  a light source configured to irradiate a pattern image with a light beam,
  an image sensor,
  a light guiding device located on a first light path from the light source to the pattern image and configured to guide the light beam irradiated by the light source to the pattern image and further guide a light reflected from the pattern image to the image sensor along a second light path, the first light path including only the light guiding device and not including any image focusing device,
  an image focusing device located on the second light path from the light guiding device to the image sensor and configured to focus the light reflected from the pattern image on the image sensor, and
  a housing configured to contain the light source, the image sensor, the light guiding device and the image focusing device, and a bottom surface of a prism in the light guiding device and a surface on which the pattern image is formed make a first angle that is half of a second angle made by a plane perpendicular to the bottom surface of the prism and the first light path from the bottom surface to the pattern image, wherein when the visual image includes the pattern image, the image detection device detects the pattern image;

an image comparing device configured to compare the pattern image detected by the image detection device with a standard image to determine whether the pattern image is substantially identical to the standard image; and a scan adjusting device configured to adjust a scanning position of at least one of at least two light beams such that the pattern image is substantially identical to the standard image.

7. An image forming apparatus comprising:

at least one photoconductive image bearing member;

at least two optical writing systems configured to irradiate the at least one photoconductive image bearing member with respective light beams while the at least two optical writing systems scan the respective light beams in a main scanning direction and the at least one photoconductive image bearing member rotates in a sub-scanning direction to form a latent image on the at least one photoconductive image bearing member;

a developing device configured to develop the latent image to form a visual image on the at least one photoconductive image bearing member;

an image detection device, comprising
  a light source configured to irradiate a pattern image with a light beam,
  an image sensor,
  a light guiding device located on a first light path from the light source to the pattern image and configured to guide the light beam irradiated by the light source to the pattern image and further guide a light reflected from the pattern image to the image sensor along a second light path, the first light path including only the light guiding device and not including any image focusing device,
  an image focusing device located on the second light path from the light guiding device to the image sensor and configured to focus the light reflected from the pattern image on the image sensor, and
  a housing configured to contain the light source, the image sensor, the light guiding device and the image focusing device, wherein when the visual image includes the pattern image, the image detection device detects the pattern image, and an optical axis of the light reflected from the pattern image coincides with an optical axis of the image focusing device, and a bottom surface of a prism in the light guiding device and a surface on which the pattern image is formed make a first angle that is half of a second angle made by a plane perpendicular to the bottom surface of the prism and the first light path from the bottom surface to the pattern image;

an image comparing device which compares the pattern image detected by the image detection device with a standard image to determine whether the pattern image is substantially identical to the standard image; and a scan adjusting device configured to adjust a scanning position of the at least one of the at least two light beams such that the pattern image is substantially identical to the standard image.

8. The image forming apparatus according to claim 7, wherein the pattern image includes two independent parallel lines arranged in the sub-scanning direction, and wherein the two independent parallel lines are formed by the respective light beams of the at least two optical writing systems.

9. The image forming apparatus according to claim 7, wherein the pattern image includes two independent parallel lines arranged in the main scanning direction, and wherein the two independent parallel lines are formed by the respective light beams of the at least two optical writing systems.

10. The image forming apparatus according to claim 7, wherein the pattern image includes two independent dots, and wherein the two independent dots are formed by the respective light beams of the at least two optical writing systems.

11. The image forming apparatus according to claim 7, wherein the latent image includes a one-line image extending in the main scanning direction in which a plurality of latent one-line images formed by the at least two optical writing systems are connected with each other.

12. The image forming apparatus according to claim 7, further comprising:
a transfer device; and
two or more photoconductive image bearing members,
wherein the two or more optical writing systems irradiate the respective two or more photoconductive image bearing members with the respective light beams to form latent images on the two or more photoconductive image bearing members,
wherein the developing device develops the latent images with different color toners, and
wherein toner images are transferred by the transfer device on a receiving material to form a multi-color image.

13. The image forming apparatus according to claim 7, wherein the two or more optical writing systems irradiate the at least one photoconductive image bearing member with the light beams to form latent images on the at least one photoconductive image bearing member, wherein the developing device develops the latent images with different color toners to form a multi-color image on the at least one photoconductive image bearing member.

14. The image forming apparatus according to claim 7, wherein a surface of the at least one photoconductive image bearing member is a mirror surface.

15. The image forming apparatus according to claim 7, further comprising:
an image reading device configured to read an image of an original,
wherein the two or more optical writing systems form the latent image according to the image information read by the image reading device.

16. An image detection device comprising:
means for irradiating a pattern image with a light beam;
means for sensing an image;
means for guiding the light beam irradiated by the means for irradiating to the pattern image along a first light path and for guiding a light reflected along a second light path from the pattern image to the means for sensing, the first light path including only the means for guiding the light and not including any means for focusing light;
means for focusing the light reflected from the pattern image on the means for sensing; and
means for housing the means for irradiating, the means for sensing, the means for guiding and the means for focusing,
wherein an optical axis of the light reflected from the pattern image coincides with an optical axis of the means for focusing, and a bottom surface of a prism in the means for guiding the light beam and a surface on which the pattern image is formed make a first angle that is half of a second angle made by a plane perpendicular to the bottom surface of the prism and the first light path from the bottom surface to the pattern image.

17. An optical writing apparatus comprising:
at least two optical means for optically irradiating an image bearing member with respective light beams while scanning the light beams to form a visual image on the image bearing member;
means for irradiating a pattern image with a light beam,
means for guiding the light beam irradiated by the means for irradiating to the pattern image along a first light path and for guiding a light reflected along a second light path from the pattern image to the means for sensing, the first light path including only the means for guiding the light and not including any means for focusing light,
means for focusing the light reflected from the pattern image on the means for sensing, and
means for housing the means for irradiating, the means for sensing, the means for guiding and the means for focusing,
wherein an optical axis of the light reflected from the pattern image coincides with an optical axis of the means for focusing, and a bottom surface of a prism in the means for guiding the light beam and a surface on which the pattern image is formed make a first angle that is half of a second angle made by a plane perpendicular to the bottom surface of the prism and the first light path from the bottom surface to the pattern image;
wherein when the visual image includes the pattern image, the means for image detection detects the pattern image;
means for comparing the pattern image detected by the means for image detection with a standard image for determining whether the pattern image is substantially identical to the standard image; and
means for adjusting a scanning position of at least one of the at least two light beams from the at least two means for optically irradiating such that the pattern image is substantially identical to the standard image.

18. An image forming apparatus comprising:
at least one photoconductive image bearing member;
at least two means for optically irradiating an image bearing member with respective light beams while scanning the respective light beams in a main scanning direction, and the at least one photoconductive image bearing member rotates in a sub-scanning direction to form a latent image on the at least one photoconductive image bearing member;
means for developing the latent image to from a visual image on the at least one photoconductive image bearing member;
means for image detection comprising:
means for irradiating a pattern image with a light beam;
means for sensing an image;
means for guiding the light beam irradiated by the means for irradiating to the pattern image along a first light path and for guiding a light reflected along a second light path from the pattern image to the means for sensing, the first light path including only the means for guiding the light and not including any means for focusing light,
means for focusing the light reflected from the pattern image on the means for sensing; and means for housing the means for irradiating, the means for sensing, the means for guiding and the means for focusing, wherein an optical axis of the light reflected from the pattern image coincides with an optical axis of the means for focusing, and a bottom surface of a prism in the means for guiding the light beam and a surface on which the pattern image is formed make a first angle that is half of a second angle made by a plane perpendicular to the bottom surface of the prism and the first light path from the bottom surface to the pattern image;

wherein when the visual image includes the pattern image, the means for image detection detects the pattern image;

means for comparing the pattern image detected by the means for image detection with a standard image for determining whether the pattern image is substantially identical to the standard image; and means for adjusting a scanning position of at least one of the at least two light beams from the at least two means for optically irradiating such that the pattern image is substantially identical to the standard image.

* * * * *